(12) United States Patent
Amihood et al.

(10) Patent No.: US 12,754,987 B2
(45) Date of Patent: Oct. 6, 2026

US012754987B2

(54) AUTHENTICATION USING ACTIVE ACOUSTIC SENSING

(71) Applicant: Google LLC, Mountain View, CA (US)

(72) Inventors: Patrick Muller Amihood, Palo Alto, CA (US); Xiaoran Fan, Irvine, CA (US); Cody Wortham, San Francisco, CA (US)

(73) Assignee: Google LLC, Mountain View, CA (US)

(*) Notice: Subject to any disclaimer, the term of this patent is extended or adjusted under 35 U.S.C. 154(b) by 34 days.

(21) Appl. No.: 19/094,114

(22) Filed: Mar. 28, 2025

(65) Prior Publication Data

US 2026/0030330 A1 Jan. 29, 2026

Related U.S. Application Data

(60) Provisional application No. 63/654,760, filed on May 31, 2024.

(51) Int. Cl.

*H04L 29/06* (2006.01)
*G06F 3/16* (2006.01)
*G06F 21/32* (2013.01)
*G10L 17/04* (2013.01)

(Continued)

(52) U.S. Cl.

CPC .............. *G06F 21/32* (2013.01); *G06F 3/167* (2013.01); *G10L 17/04* (2013.01); *G10L 17/18* (2013.01);

(Continued)

(58) Field of Classification Search

CPC ......... G06F 21/32; G06F 3/167; G10L 17/04; G10L 17/18; G10L 25/30; G10L 17/22;

(Continued)

(56) References Cited

U.S. PATENT DOCUMENTS 10,659,867 B2 * 5/2020 Petrank ................ H04R 29/001
2006/0241975 A1 * 10/2006 Brown .................. G16H 40/67 600/300

(Continued)

FOREIGN PATENT DOCUMENTS

CN 114144790 B * 7/2024 ............ G06N 3/094

OTHER PUBLICATIONS

Gao, Yang, et al. "EarEcho: Using ear canal echo for wearable authentication." Proceedings of the ACM on Interactive, Mobile, Wearable and Ubiquitous Technologies 3.3 (2019): 1-24. (Year: 2019).*

(Continued)

*Primary Examiner* — Shawnchoy Rahman
(74) *Attorney, Agent, or Firm* — Colby Nipper PLLC

(57) ABSTRACT

Techniques and apparatuses are described that perform authentication using active acoustic sensing. During active acoustic sensing, a hearable transmits and receives at least one ultrasound signal, which propagates within a person's ear canal. The ultrasound signal contains information that is related to the vocalization as well as additional contextual information in how the person created the vocalization using their body and how the vocalization travels, via bone conduction, from the person's vocal chords to their ear canal. With active acoustic sensing, the hearable can generate an ultrasound-based voice signature based on the ultrasound signal and directly perform authentication based on the ultrasound-based voice signature. In some cases, authentication can be performed using a combination of the ultrasound-based voice signature and a voice signature. With active acoustic sensing, the hearable can realize a target spoof acceptance rate and a target false acceptance rate to provide a desired level of security.

20 Claims, 15 Drawing Sheets

(51) Int. Cl.

| | |
|---|---|
| ***G10L 17/18*** | (2013.01) |
| ***G10L 25/30*** | (2013.01) |
| ***H04R 1/10*** | (2006.01) |
| ***H04R 3/04*** | (2006.01) |

(52) U.S. Cl.

CPC ............ *G10L 25/30* (2013.01); *H04R 1/1016* (2013.01); *H04R 1/1083* (2013.01); *H04R 1/1091* (2013.01); *H04R 3/04* (2013.01)

(58) Field of Classification Search

CPC .. H04R 1/1016; H04R 1/1083; H04R 1/1091; H04R 3/04

See application file for complete search history.

(56) References Cited

U.S. PATENT DOCUMENTS

| | | | | |
|---|---|---|---|---|
| 2007/0276658 | A1* | 11/2007 | Douglass | G10L 21/0364 704/205 |
| 2016/0269833 | A1 | 9/2016 | Norris et al. | |
| 2018/0167385 | A1* | 6/2018 | Ananthapur Bache | H04B 11/00 |
| 2020/0184979 | A1* | 6/2020 | Keret | G10L 25/51 |
| 2021/0117530 | A1 | 4/2021 | Lesso | |
| 2021/0201918 | A1 | 7/2021 | Okabe et al. | |
| 2022/0408173 | A1 | 12/2022 | Gong et al. | |

OTHER PUBLICATIONS

Gao, Yang, et al. "Voice in ear: Spoofing-resistant and passphrase-independent body sound authentication." Proceedings of the ACM on Interactive, Mobile, Wearable and Ubiquitous Technologies 5.1 (2021): 1-25. (Year: 2021).*

Martins, Joao, "Vesper Launches 2nd Generation Smart Piezoelectric Voice Accelerometer with ZeroPower Sensing", Mar. 28, 2022, 9 pages.

Yang, et al., "EarEcho: Using Ear Canal Echo for Wearable Authentication", Sep. 2019, 24 pages.

* cited by examiner

AUTHENTICATION USING ACTIVE ACOUSTIC SENSING

CROSS-REFERENCE TO RELATED APPLICATION

This application claims the benefit of U.S. Provisional Patent Application Ser. No. 63/654,760, filed on May 31, 2024, the disclosure of which is incorporated by reference herein in its entirety.

BACKGROUND

Wireless technology has become prevalent in everyday life, making communication and data readily accessible to users. One type of wireless technology are wireless hearables, examples of which include wireless earbuds and wireless headphones. Wireless hearables have allowed users freedom of movement while listening to audio content from music, audio books, podcasts, and videos. With the prevalence of wireless hearables, there is a market for adding additional features to existing hearables without introducing hardware changes.

SUMMARY

Techniques and apparatuses are described for performing authentication using active acoustic sensing. During active acoustic sensing, a hearable transmits and receives at least one ultrasound signal, which propagates within a person's ear canal. This ultrasound signal can be modulated by the person's vocalization as well as by other muscle movements associated with the vocalization (e.g., jaw movement). As such, the ultrasound signal contains information that is related to the vocalization as well as additional contextual information in how the person created the vocalization using their body and how the vocalization travels, via bone conduction, from the person's vocal chords to their ear canal. With active acoustic sensing, the hearable can generate an ultrasound-based voice signature based on the ultrasound signal and directly perform authentication based on the ultrasound-based voice signature. In some cases, authentication can be performed using a combination of the ultrasound-based voice signature and a voice signature. With active acoustic sensing, the hearable can realize a target spoof acceptance rate and a target false acceptance rate to provide a desired level of security for authentication.

BRIEF DESCRIPTION OF DRAWINGS

Apparatuses for and techniques that perform authentication using active acoustic sensing are described with reference to the following drawings. The same numbers are used throughout the drawings to reference like features and components:

FIG. 2-1 illustrates an example situation in which authentication using active acoustic sensing can improve user experience;

FIG. 2-2 illustrates an example situation in which authentication using active acoustic sensing can prevent spoofing;

DETAILED DESCRIPTION

Figure 1:
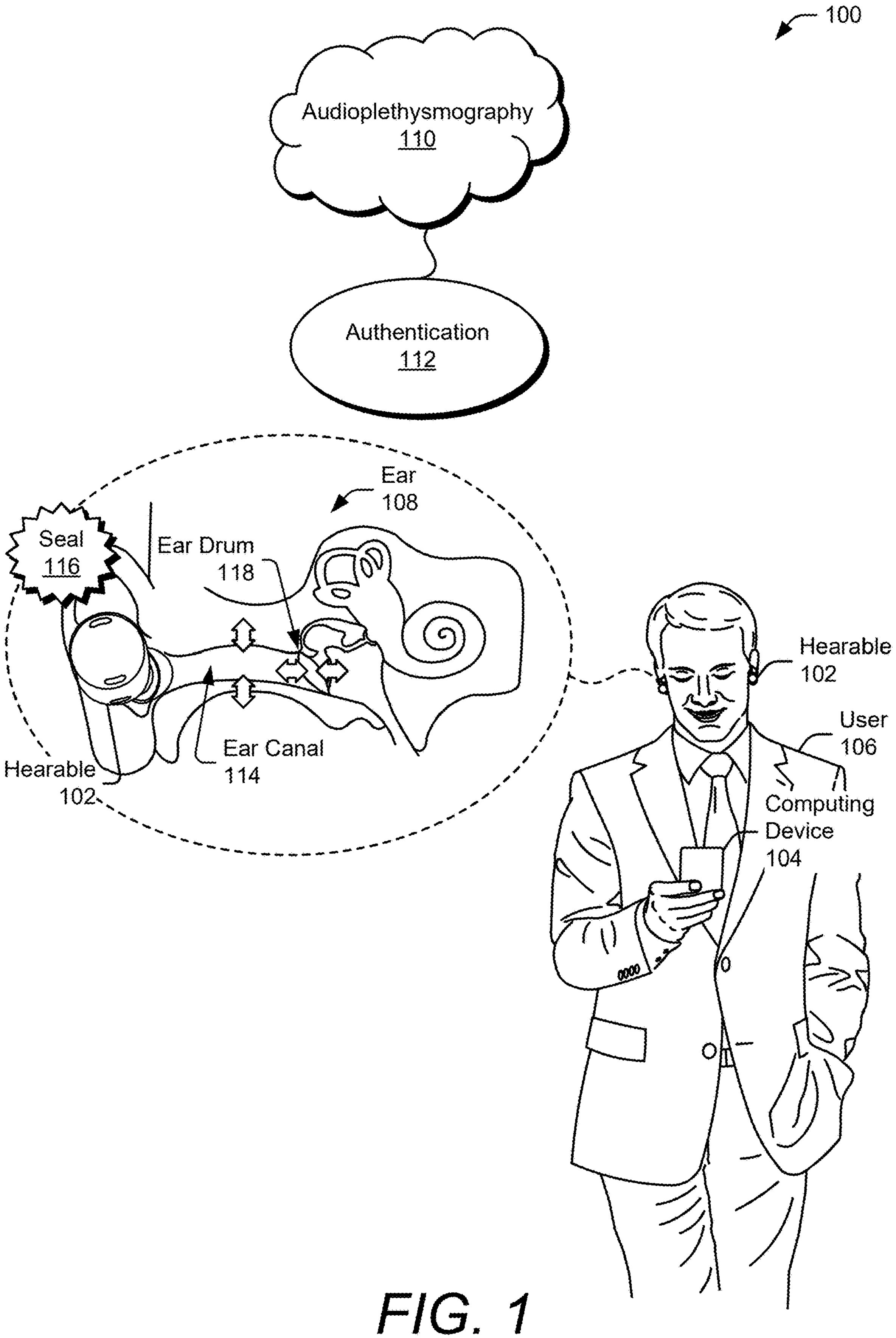
FIG. 1 illustrates an example environment in which authentication using active acoustic sensing can be implemented.

As electronic devices become more ubiquitous, users incorporate them into everyday life. A user, for example, may use an electronic device to get daily weather and traffic information, control a temperature of a home, answer a doorbell, turn on or off a light, and/or play background music. Interacting with some electronic devices, however, can be cumbersome and inefficient. An electronic device, for instance, can have a physical user interface that may require a user to navigate through one or more prompts by physically touching the electronic device. In this case, the user has to devote attention away from other primary tasks to interact with the electronic device, which can be inconvenient and disruptive.

To address this problem, some electronic devices support voice control, which enables a user to interact with the electronic device in a non-physical and less cognitively demanding way compared to other interfaces that require physical touch and/or the user's visual attention. With voice control, the electronic device seamlessly exists in the surrounding environment and provides the user access to information and services while the user performs a primary task, such as cooking, cleaning, driving, talking with people, or reading a book. For voice control, the electronic device detects a user's speech and recognizes a phrase (or command) that is spoken by the user.

While voice control can provide a convenient means of interacting with an electronic device, it can be challenging to ensure the person interacting with the voice control is authorized to control the electronic device. While some authentication techniques may require the user to interact with the electronic device and physically type in a password on the electronic device prior to using voice control, this presents an inconvenience and requires the user to keep the electronic device nearby.

Different authentication techniques can provide different levels of security based on a spoof acceptance rate (SAR) and a false acceptance rate (FAR). The spoof acceptance rate provides an indication of how easy it is to spoof (e.g., overcome, trick, or thwart) the authentication technique. The false acceptance rate provides an indication of how often the authentication technique mistakenly authenticates an incorrect input. Lower values for the spoof acceptance rate and the false acceptance rate indicate a higher level of security.

Some touchless authentication techniques rely on voice matching. In this case, the authentication technique can be trained to recognize a command phrase as being spoken by an authorized user. Voice matching, however, can be tricky to perform in environments with a substantial amount of background noise. Also, in situations in which the user wishes to speak discretely, voice matching can have a difficult time authenticating the user if the user speaks too quietly. Another challenge with voice matching involves an unauthorized user using a recording of an authorized user's voice to gain control of the electronic device. By itself, voice matching can have an unacceptably high spoof acceptance rate, which can compromise security of the electronic device.

To provide some measure of protection against spoofing, some authentication techniques combine voice matching with a voice accelerometer. The voice accelerometer can be integrated within a hearable and can identify whether or not the person wearing the hearable is talking. In a loud environment, the voice accelerometer can be used to distinguish between speech that is coming from the person wearing the hearable and speech that is coming from the external environment. In this way, the voice accelerometer can improve the false alarm rate of the authentication technique. The voice accelerometer can also be used to distinguish between speech that is coming from the person wearing the hearable and speech that is coming from a recording, which can improve the spoof acceptance rate. However, if an unauthorized person has access to the hearable, this person can mouth the command (e.g., speak silently) while playing the recording and overcome this protection measure.

To improve aesthetics and reduce encumbrance, it can be desirable to design hearables with smaller sizes. As space becomes limited, it can be challenging to integrate additional components, such as the voice accelerometer, within the hearables. With the prevalence of hearables, there is a market for adding additional features to existing hearables to enhance security for authentication without introducing hardware changes.

Provided according to one or more preferred embodiments is a hearable, such as an earbud, that is capable of performing a novel physiological monitoring process termed herein audioplethysmography. Audioplethysmography is an active acoustic method capable of sensing subtle physiologically-related changes observable at a person's outer and middle ear. Instead of relying on other auxiliary sensors, such as optical or electrical sensors, audioplethysmography involves transmitting and receiving ultrasound signals that at least partially propagate within a person's ear canal. To perform audioplethysmography, the hearable forms at least a partial seal in or around the person's outer ear. This seal enables formation of an acoustic circuit, which includes the seal, the hearable, the ear canal, and an ear drum of the ear. By transmitting and receiving ultrasound signals, the hearable can recognize changes in the acoustic circuit to perform authentication. Authentication involves identifying whether the person wearing the hearable and speaking is authorized to utilize the hearable and/or a computing device that is coupled to the hearable. The person's vocalization can include any sound that is produced using the person's lung's, vocal cords, and/or mouth. Example types of vocalizations can involve the person speaking, whispering, shouting, humming, whistling, singing, or making other utterances.

During active acoustic sensing, the hearable 102 transmits and receives at least one ultrasound signal, which propagates within the person's ear canal. This ultrasound signal can be modulated by the person's vocalization as well as by other muscle movements associated with the vocalization (e.g., jaw movement). As such, the ultrasound signal contains information that is related to the vocalization as well as additional contextual information in how the person created the vocalization using their body and how the vocalization travels, via bone conduction, from the person's vocal chords to their ear canal. With active acoustic sensing, the hearable can generate an ultrasound-based voice signature based on the ultrasound signal and directly perform authentication based on the ultrasound-based voice signature. In some cases, authentication can be performed using a combination of the ultrasound-based voice signature and a voice signature. With active acoustic sensing, the hearable can realize a target spoof acceptance rate and a target false acceptance rate to provide a desired level of security.

Utilizing active acoustic sensing for authentication can provide several benefits. In a first aspect, active acoustic sensing enables a person wearing a hearable to be authenticated without having to be previously-authenticated through their computing device and without having to physically interact with their computing device. As such, the person can have immediate access to applications, including a virtual assistant, through the computing device without having to directly interact with and/or unlock the computing device. In a second aspect, active acoustic sensing can support continuous authentication while the person is making vocalizations. As such, authentication is no longer restricted to situations during which the person vocalizes a previously-specified phrase or a command phrase.

In a third aspect, active acoustic sensing can be more challenging to spoof compared to other types of sensors, such as a voice accelerometer. The additional contextual information provided by the ultrasound-based voice signature is unique to each individual person and can be difficult to record, estimate, and/or reproduce. In a fourth aspect, active acoustic sensing evaluates the person's vocalization using a different physiological mechanism than voice matching. This provides an independent means of analyzing the vocalization relative to voice matching. In a fifth aspect, some hearables can be configured to support authentication without the need for additional hardware. As such, the size, cost, and power usage of the hearable can help make authentication accessible to a larger group of people and improve the user experience with hearables.

Operating Environment

FIG. 1 is an illustration of an example environment 100 in which active acoustic sensing can be implemented. In the example environment 100, a hearable 102 is connected to a computing device 104 using a physical or wireless interface. The hearable 102 is a device that can play audible content provided by the computing device 104 and direct the audible content into a user 106's ear 108. In this example, the hearable 102 operates together with the computing device 104. In other examples, the hearable 102 can operate or be implemented as a stand-alone device. Although depicted as a smartphone, the computing device 104 can include other types of devices, including those described with respect to FIG. 3.

The hearable 102 is capable of performing audioplethysmography 110, which is an active acoustic method of sensing that occurs at the ear 108. The hearable 102 can perform this sensing without the use of other auxiliary sensors, such as an optical sensor or an electrical sensor. Through audioplethysmography 110, the hearable 102 can perform authentication 112. Authentication 112 enables the hearable 102 (or the computing device 104) to determine whether the person wearing the hearable 102 is an authorized user 106 of the hearable 102 and/or an authorized user 106 of the computing device 104. One aspect of the authentication 112 is based on a vocalization made by the user 106. In some cases, the user 106 voices a phrase, which can involve any type of vocalization associated with speaking, whispering, shouting, humming, whistling, singing, or other utterances. The phrase can include a single word, multiple words, or words (e.g., just sounds).

To perform authentication 112, the hearable 102 uses audioplethysmography 110 to detect subtle pressure waves that propagate to the user 106's ear canal 114. These pressure waves modify characteristics of ultrasound signals that are transmitted and received by the hearable 102 and propagate through the ear canal 114. As the user 106 utters a sound, the ear canal 114 deforms at least in part due to the vocalization itself and at least in part due to the muscle movements associated with performing the vocalization. As such, at least a portion of the received ultrasound signal includes information that is related to the user 106's vocalization and at least another portion of the received ultrasound signal includes other information that is associated with muscle movements associated with generating the vocalization. In some cases, the user 106's vocalization can be directly reconstructed from the received ultrasound signal.

To use audioplethysmography 110, the user 106 positions the hearable 102 in a manner that creates at least a partial seal 116 around or in the ear 108. Some parts of the ear 108 are shown in FIG. 1, including the ear canal 114 and an ear drum 118 (or tympanic membrane). Due to the seal 116, the hearable 102, the ear canal 114, and the ear drum 118 couple together to form an acoustic circuit. Audioplethysmography 110 involves, at least in part, measuring properties associated with this acoustic circuit. The properties of the acoustic circuit can change due to a variety of different situations or actions.

For example, consider a change that occurs in a physical structure of the ear 108. Example changes to the physical structure include a change in a geometric shape of the ear canal 114 and/or a change in a volume of the ear canal 114. This change can be caused, at least in part, by a pressure wave associated with the user 106's speech. For instance, the tissue around the ear canal 114 and the ear drum 118 itself are slightly "squeezed" due to the bone conduction and/or the pressure wave. This squeeze causes a volume of the ear canal 114 to be slightly reduced. As the squeezing subsides, the volume of the ear canal 114 is slightly increased. The increasing and decreasing of the volume of the ear canal 114 is indicated by the arrows in FIG. 1. The physical changes within the ear 108 can modulate an amplitude and/or phase of an ultrasound signal that propagates through the ear canal 114.

The techniques for audioplethysmography 110 can be performed while the hearable 102 is rendering (e.g., playing or transmitting) audible content and/or while the user 106 is actively moving or performing an activity. As such, active acoustic sensing enables the hearable 102 to perform authentication 112 in a variety of different situations. One such situation is further described with respect to FIG. 2-1.

Figures 1, 2:
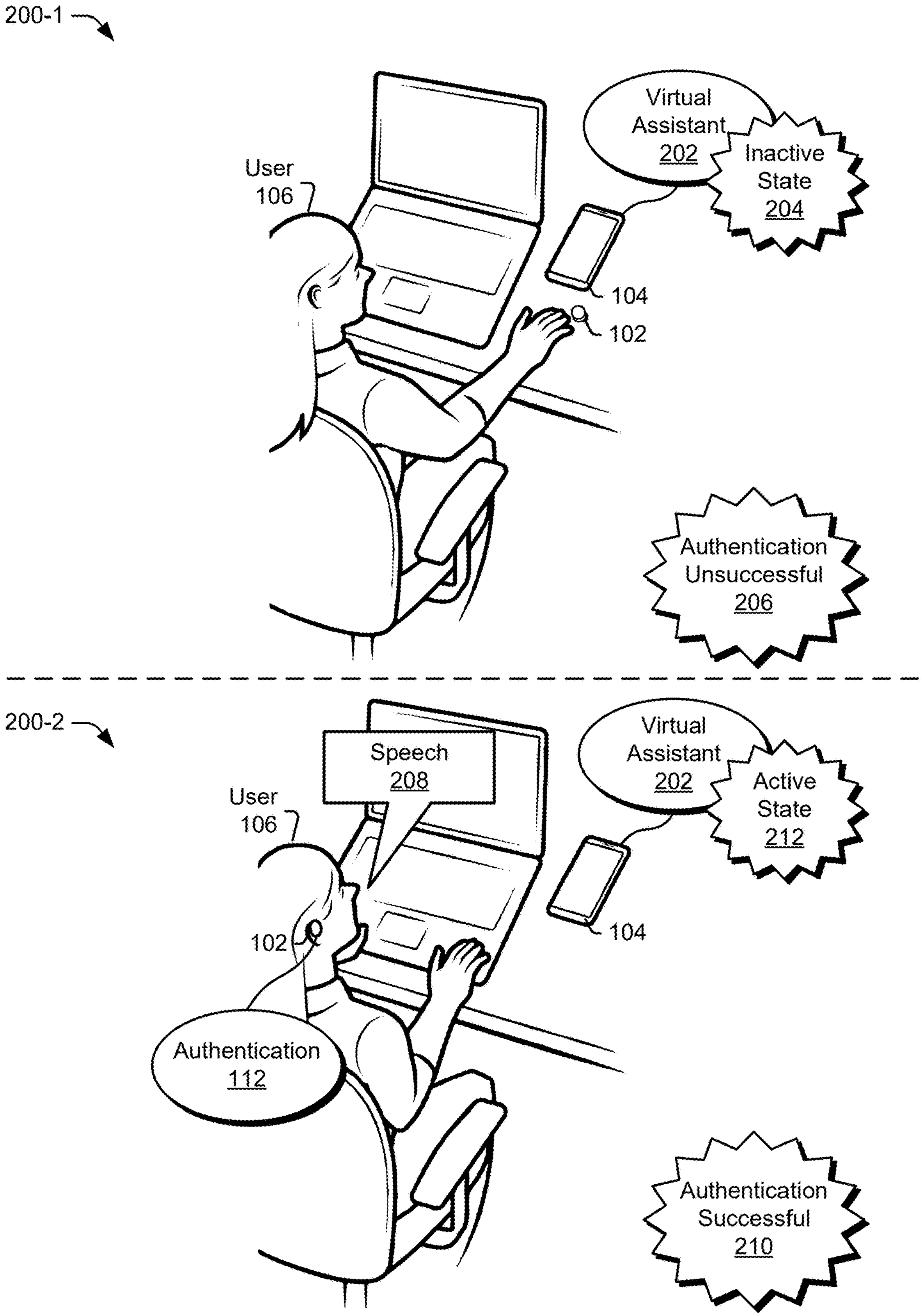
Figure 2:
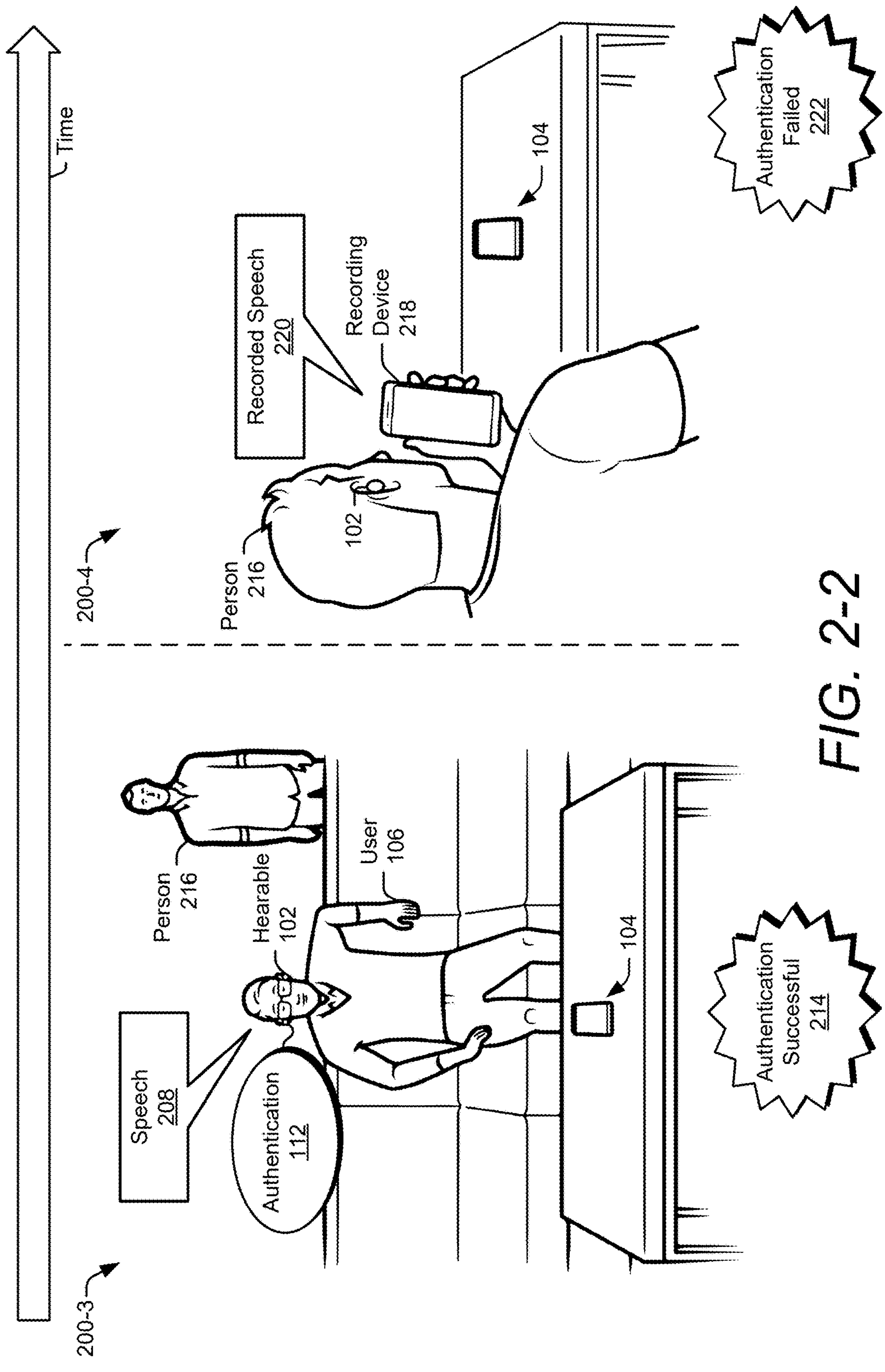

FIG. 2-1 illustrates an example situation in which authentication 112 using active acoustic sensing can improve the user experience. At 200-1, the user 106 is an authorized user of the hearable 102 and an authorized user of the computing device 104. While the user 106 is working at a desk, they have positioned their hearable 102 nearby (e.g., within reach). The computing device 104 may also be positioned nearby, as shown in FIG. 2-1, or may be positioned beyond the user 106's reach but within communication range of the hearable 102. In some cases, the computing device 104 may be positioned sufficiently far away from the user 106 such that the computing device 104 is not within a line-of-sight of the user 106 and/or is not able to detect the user 106's voice.

The computing device 104 is capable of executing an application that provides a virtual assistant 202 (e.g., a voice-assistant service or a personal agent). Through voice commands, the user 106 can interact with the virtual assistant 202 to activate certain features of the computing device 104. In this manner, the virtual assistant 202 can provide hands-free control of the computing device 104 through spoken commands. The virtual assistant 202 can also communicate information to the user 106 through the hearable 102 or through the computing device's speaker or display.

At 200-1, the computing device 104 is in a locked state. Without a means of authenticating the user 106, the computing device 104 causes the virtual assistant 202 to be in an inactive state 204 to prevent unauthorized access. During this time, the hearable 102 is not worn by the user 106. The hearable 102 can perform active acoustic sensing for authentication 112 and determine that the authentication 112 is unsuccessful, as indicated at 206. The authentication 112 is unsuccessful because the hearable 102 is unable to detect an ultrasound-based voice signature of the user 106 as the user 106 is not wearing the hearable 102. Additionally or alternatively, the hearable 102 can use on-head detection techniques to determine that the hearable 102 is not currently worn by a person. In this manner, on-head detection can alternatively be used to determine that the authentication 112 is unsuccessful.

At 200-2, the user 106 puts on the hearable 102 to interact with the virtual assistant 202. With the hearable 102, the user 106 can speak to the virtual assistant 202 in a quieter voice than if the user 106 attempted to speak to the computing device 104. This can be particularly advantageous if the computing device 104 is positioned at a significantly far distance from the user 106. The hearable 102 also allows the user 106 to privately hear the virtual assistant 202's response instead of broadcasting the response through the computing device 104's speakers. This can be particularly advantageous in certain environments, such as in a classroom, a library, an office, or a public place.

Prior to enabling the user 106 to interact with the virtual assistant 202, the hearable 102 performs the authentication 112 while the user 106 audibly talks to generate speech 208. The speech 208 can represent any type of vocalization made by the user 106. In some implementations, the speech 208 can be a unique phrase (e.g., a voiceprint phrase) or a collection of words. Sometimes the hearable 102 and/or the computing device 104 is previously-configured to recognize the unique phrase for identification and/or for authentication purposes. Additionally or alternatively, the speech 208 may also enable the user 106 to control an aspect of the hearable 102 and/or the computing device 104. For example, the speech 208 can be a command that is recognized by the virtual assistant 202. The speech 208 can additionally or alternatively include other types of vocalizations that may or may not include words, such as humming or singing.

In other implementations, the speech 208 can involve the user 106 communicating to another person or communicating to an entity that differs from the hearable 102 and the computing device 104. In this case, the speech 208 can be incidental to what the user 106 is doing and may not be directly associated with a previously-configured voiceprint phrase or a previously-configured command for controlling the hearable 102 and/or the computing device 104.

The hearable 102 uses audioplethysmography 110 to generate an ultrasound-based voice signature of the user 106 based on the speech 208. The ultrasound-based voice signature is further described with respect to FIG. 7. With the ultrasound-based voice signature, the hearable 102 successfully authenticates the user 106, as indicated at 210. Upon successful authentication 112, the hearable 102 causes the computing device 104 to activate the virtual assistant 202. In this case, the virtual assistant 202 transitions from the inactive state 204 at 200-1 to the active state 212 at 200-2. In some cases, the hearable 102 passes information regarding the speech 208 to the virtual assistant 202 to enable the virtual assistant 202 to perform an operation based on the speech 208.

As seen in FIG. 2-1, authentication 112 performed using the hearable 102 can be a convenient means for the user 106 to interact with the virtual assistant 202 on the computing device 104. With the techniques of using active acoustic sensing for authentication 112, the user 106 can control the computing device 104 and/or use the virtual assistant 202 without having to physically interact with the computing device 104 (e.g., enter a passcode). Authentication 112 using active acoustic sensing can also be challenging to spoof, as further described with respect to FIG. 2-2.

FIG. 2-2 illustrates example situation in which authentication 112 using active acoustic sensing can prevent spoofing. At 200-3, the user 106 speaks (e.g., utters a sound) while wearing at least one hearable 102. The hearable 102 performs authentication 112 using audioplethysmography 110 and determines that an authorized user 106 is speaking, as indicated at 214. Unbeknownst to the user 106, another person 216 is recording the user 106's speech 208 with a recording device 218. This person 216 is not an authorized user of the computing device 104 or the hearable 102. Without the techniques for performing authentication 112 using the active acoustic sensing of the hearable 102, the computing device 104's security can be vulnerable to spoofing techniques that utilize this recorded speech 220.

In environment 200-4, the person 216 is proximate to or in possession of the computing device 104. In this situation, the user 106 may have accidentally walked away from the computing device 104 or the person 216 may have stolen the computing device 104 from the user 106. The person 216 also has control of the hearable 102.

To access the computing device 104, the person 216 plays the recorded speech 220 through speakers of the recording device 218 while wearing the hearable 102 and silently mimics the movements associated with generating the speech 208 by moving their jaw. Other hearables 102 that rely on voice matching or a combination of voice matching and a voice accelerometer to perform authentication can be spoofed in this situation.

The hearable 102 in FIG. 2-2, however, performs authentication 112 using active acoustic sensing. The active acoustic sensing determines that an ultrasound-based voice signature of the person 216 at 200-4 does not match a known ultrasound-based voice signature of the user 106. Accordingly, the hearable 102 does not authenticate the person 216 at 200-4 and the authentication is correctly determined to have failed, as indicated at 222. In this manner, the hearable 102 denies the person 216 access to the features of the computing device 104, such as the virtual assistant 202.

In some situations, the authentication 112 fails at 200-4 because the hearable 102 is sensitive to differences in propagation of an ultrasound signal within the ear canals of the user 106 and the person 216. In one aspect, the hearable 102 can determine that the jaw movement performed by the person 216 differs from the jaw movement performed by the user 106. In another aspect, the hearable 102 can determine that a component of the ultrasound signal that is dependent upon the speech 208 and the propagation of the speech 208 from the vocal chords to the ear canal 114 differs between the user 106 and the person 216. As such, authentication 112 using active acoustic sensing can provide enhanced security for accessing features of the computing device 104 through voice commands. Example implementations of the computing device 104 are further described with respect to FIG. 3.

Figure 3:
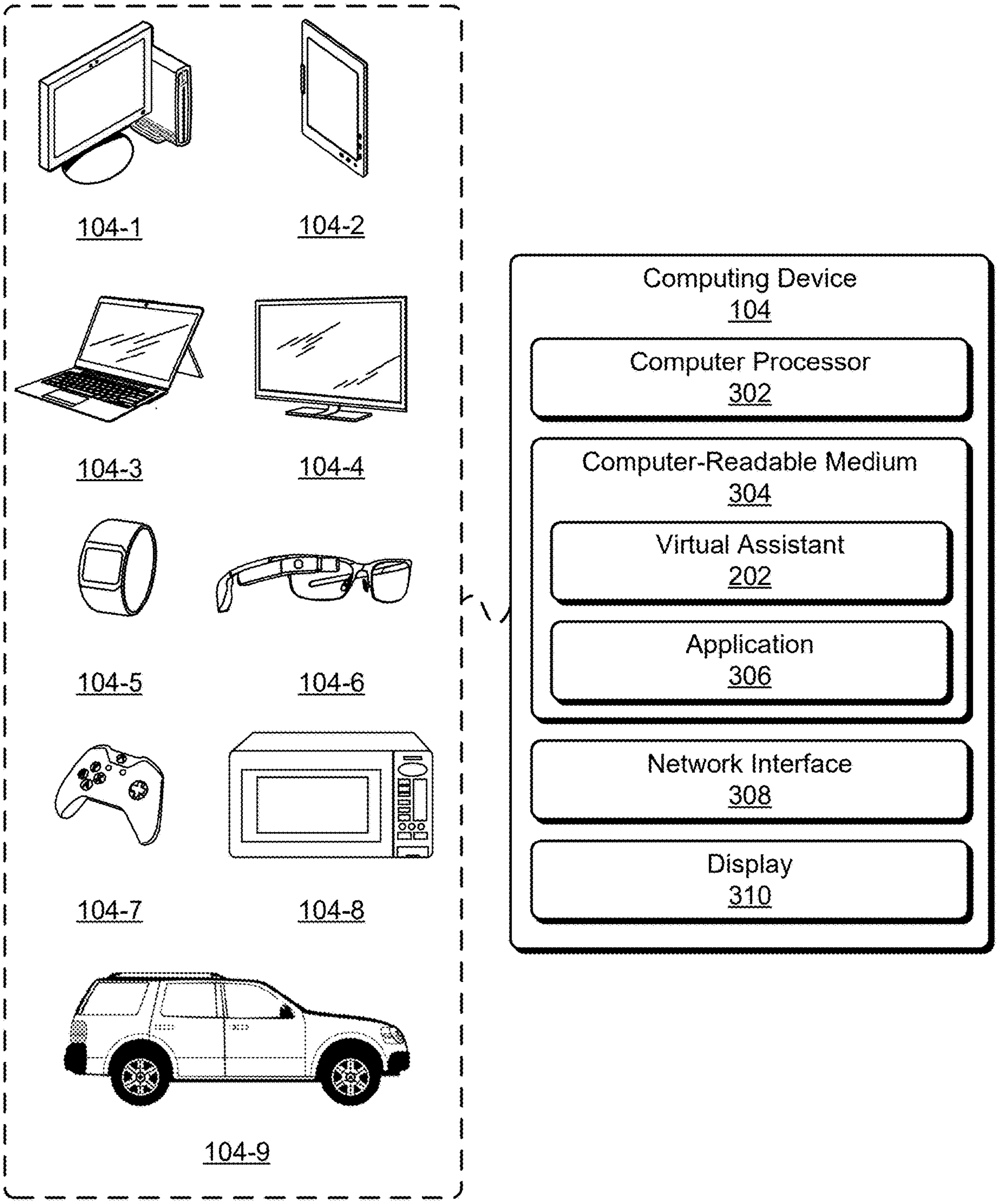
FIG. 3 illustrates example components of a computing device.

FIG. 3 illustrates example implementations of the computing device 104. The computing device 104 is illustrated with various non-limiting example devices including a desktop computer 104-1, a tablet 104-2, a laptop 104-3, a television 104-4, a computing watch 104-5, computing glasses 104-6, a gaming system 104-7, a microwave 104-8, and a vehicle 104-9. Other devices may also be used, such as an augmented and/or virtual reality headset, a home service device, a smart speaker, a smart thermostat, a baby monitor, a Wi-Fi™ router, a drone, a trackpad, a drawing pad, a netbook, an e-reader, a home automation and control system, a wall display, and another home appliance. Note that the computing device 104 can be wearable, non-wearable but mobile, or relatively immobile (e.g., desktops and appliances).

The computing device 104 includes one or more computer processors 302 and at least one computer-readable medium 304, which includes memory media and storage media. Applications and/or an operating system (not shown) embodied as computer-readable instructions on the computer-readable medium 304 can be executed by the computer processor 302 to provide some of the functionalities described herein. The computer-readable medium 304 can optionally include the virtual assistant 202 and/or an application 306.

The virtual assistant 202 can enable the user 106 to control the computing device 104 via voice commands, as described with respect to FIG. 2-1. The application 306 can use information provided by the hearable 102 to perform an action. Example actions can include displaying data associated with audioplethysmography 110 to the user 106. For authentication 112, the application 306 can indicate whether or not authentication through audioplethysmography 110 is successful. In some cases, the application 306 can be a payment application. Upon successful authentication 112, the payment application can allow a payment to be processed. In another case, the application 306 can be a security application. The security application can enable and/or disable voice control to control access to other applications, such as the virtual assistant 202, based on the authentication 112. The virtual assistant 202 and/or the application 306 can utilize aspects of the authentication 112 to provide certain features and/or enhance security of the computing device 104.

The computing device 104 can also include a network interface 308 for communicating data over wired, wireless, or optical networks. For example, the network interface 308 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, Bluetooth®, and the like. The computing device 104 may also include the display 310. Although not explicitly shown, the hearable 102 can be integrated within the computing device 104, or can connect physically or wirelessly to the computing device 104. The hearable 102 is further described with respect to FIG. 4.

Figure 4:
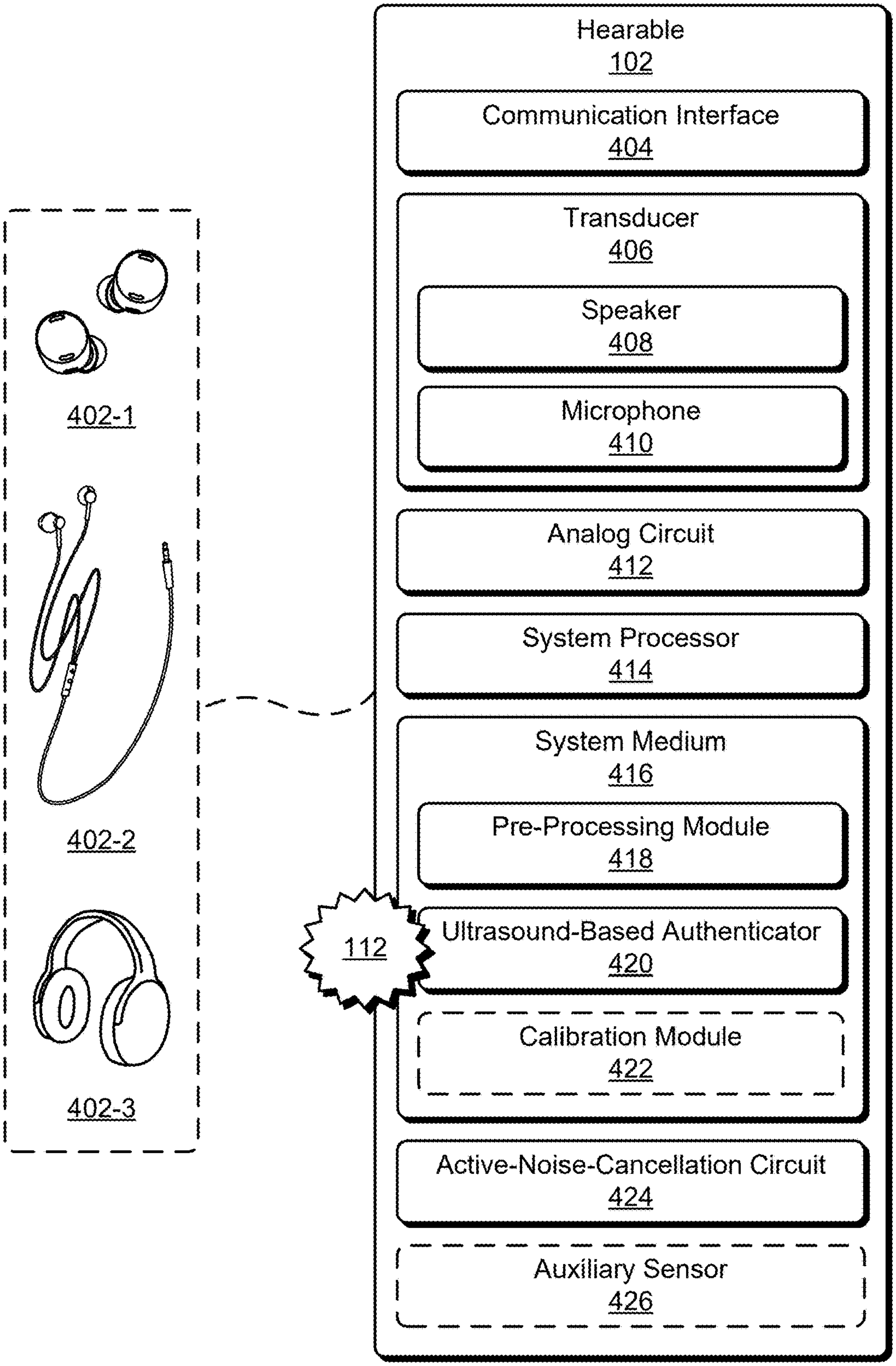
FIG. 4 illustrates example components of a hearable.

FIG. 4 illustrates an example hearable 102. The hearable 102 is illustrated with various non-limiting example devices, including wireless earbuds 402-1, wired earbuds 402-2, and headphones 402-3. The earbuds 402-1 and 402-2 are a type of in-ear device that fits into the ear canal 114. Each earbud 402-1 or 402-2 can represent a hearable 102. Headphones 402-3 can rest on top of or over the ears 108. The headphones 402-3 can represent closed-back headphones, open-back headphones, on-ear headphones, or over-ear headphones. Each headphone 402-2 includes two hearables 102, which are physically packaged together. In general, there is one hearable 102 for each ear 108. The headphones 402-3 may be designed in some manner or may utilize techniques, such as beamforming, to assist with directing signals used for audioplethysmography 110 into the ear canal 114.

The hearable 102 includes a communication interface 404 to communicate with the computing device 104, though this need not be used when the hearable 102 is integrated within the computing device 104. The communication interface 404 can be a wired interface or a wireless interface, in which audio content is passed from the computing device 104 to the hearable 102. The hearable 102 can also use the communication interface 404 to pass data associated with audioplethysmography 110 and/or authentication 112 to the computing device 104. In general, the data provided by the communication interface 404 is in a format usable by the virtual assistant 202, the application 306, or another application of the computing device 104.

The communication interface 404 also enables the hearable 102 to communicate with another hearable 102. During bistatic sensing, for instance, the hearable 102 can use the communication interface 404 to coordinate with the other hearable 102 to support two-ear audioplethysmography 110, as further described with respect to FIG. 5. In particular, the transmitting hearable 102 can communicate timing and waveform information to the receiving hearable 102 to enable the receiving hearable 102 to appropriately demodulate a received ultrasound signal.

The hearable 102 includes at least one transducer 406 that can convert electrical signals into sound waves. The transducer 406 can also detect and convert sound waves into electrical signals. These sound waves may include ultrasonic frequencies, which may be used for audioplethysmography 110. In particular, a frequency spectrum (e.g., range of frequencies) that the transducer 406 uses to generate an ultrasound signal can include frequencies from the ultrasonic range, e.g., between 20 kHz to 2 megahertz (MHZ). Other example frequency spectrums for audioplethysmography 110 can encompass frequencies between 20 and 60 kHz or between 30 and 40 kHz.

In an example implementation, the transducer 406 has a monostatic topology. With this topology, the transducer 406 can convert the electrical signals into sound waves and convert sound waves into electrical signals (e.g., can transmit or receive acoustic and/or ultrasound signals). Example monostatic transducers may include piezoelectric transducers, capacitive transducers, and micro-machined ultrasonic transducers (MUTs) that use microelectromechanical systems (MEMS) technology.

Alternatively, the transducer 406 can be implemented with a bistatic topology, which includes multiple transducers that are physically separate. In this case, a first transducer converts the electrical signal into sound waves (e.g., transmits acoustic and/or ultrasound signals), and a second transducer converts sound waves into an electrical signal (e.g., receives the acoustic and/or ultrasound signals). An example bistatic topology can be implemented using at least one speaker 408 and at least one microphone 410. The speaker 408 and the microphone 410 can be dedicated for audioplethysmography 110 or can be used for both audioplethysmography 110 and other functions of the computing device 104 (e.g., passive audio sensing, presenting audible content to the user 106, capturing the user 106's voice for a phone call, or for voice control).

In general, the speaker 408 and the microphone 410 are directed towards the ear canal 114 (e.g., oriented towards the ear canal 114). Accordingly, the speaker 408 can direct ultrasound signals towards the ear canal 114, and the microphone 410 is responsive to receiving ultrasound signals from the direction associated with the ear canal 114. In some cases, the hearable 102 includes another microphone 410 that is directed away from the ear canal 114 towards an external environment (e.g., oriented away from the ear canal 114). This other microphone can be used to receive over-the-air signals, which can include the user 106's voice and/or environmental noise.

The hearable 102 includes at least one analog circuit 412, which includes circuitry and logic for conditioning electrical signals in an analog domain. The analog circuit 412 can include analog-to-digital converters, digital-to-analog converters, amplifiers, filters, mixers, and switches for generating and modifying electrical signals. In some implementations, the analog circuit 412 includes other hardware circuitry associated with the speaker 408 or microphone 410.

The hearable 102 also includes at least one system processor 414 and at least one system medium 416 (e.g., one or more computer-readable storage media). In the depicted configuration, the system medium 416 includes a pre-processing module 418 and an ultrasound-based authenticator 420. The system medium 416 also optionally includes a calibration module 422. The pre-processing module 418, the ultrasound-based authenticator 420, and the calibration module 422 can be implemented using hardware, software, firmware, or a combination thereof. In this example, the system processor 414 implements the pre-processing module 418, the ultrasound-based authenticator 420, and the calibration module 422. In an alternative example, the computer processor 302 of the computing device 104 can implement at least a portion of the pre-processing module 418, the ultrasound-based authenticator 420, and/or the calibration module 422. In this case, the hearable 102 can communicate digital samples of the ultrasound signals to the computing device 104 using the communication interface 404.

Figure 6:
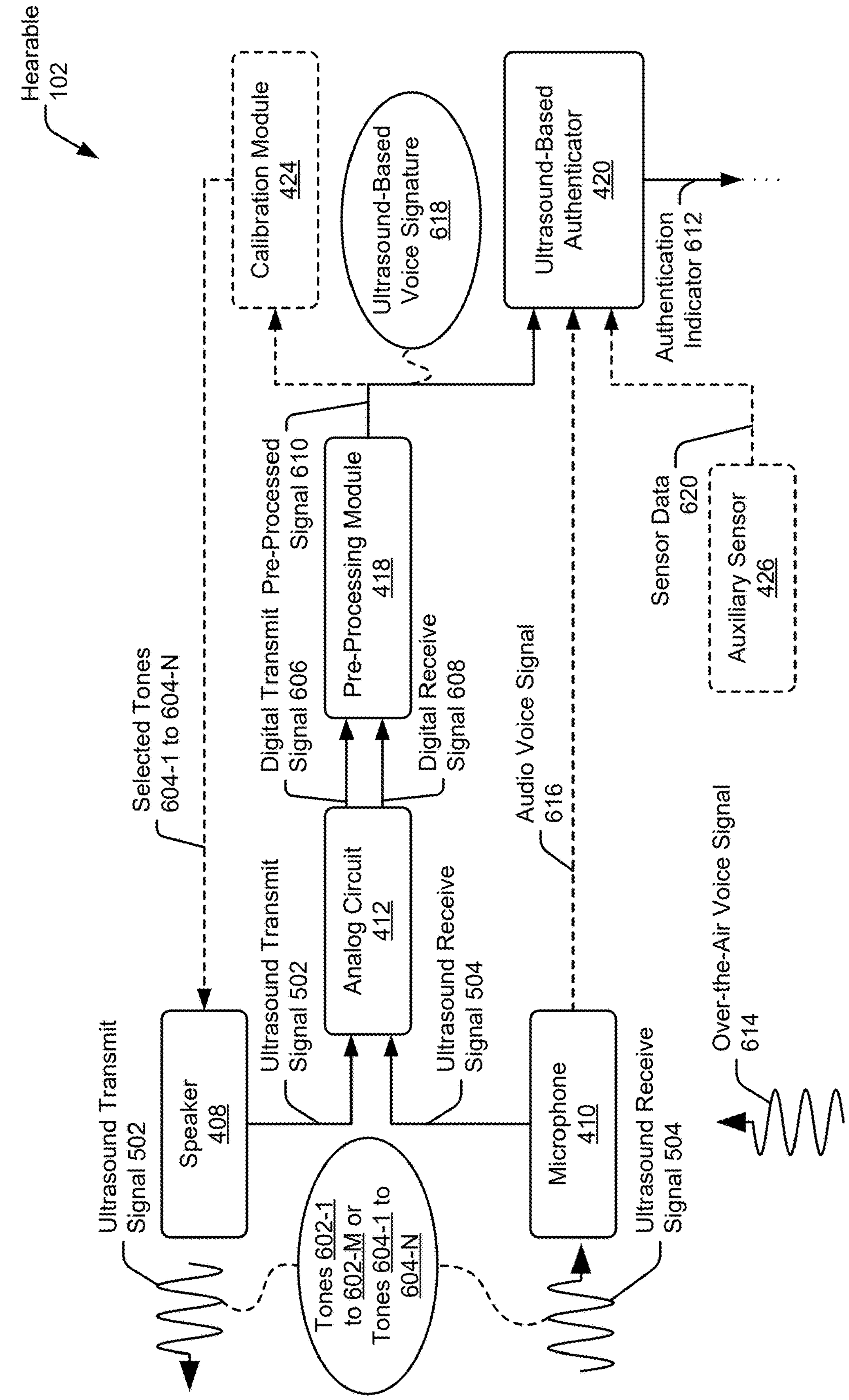
FIG. 6 illustrates an example implementation of a hearable capable of performing authentication using active acoustic sensing.

Operations of the pre-processing module 418, the ultrasound-based authenticator 420, and the calibration module 422 are further described with respect to FIG. 6. Aspects of authentication 112 using active acoustic sensing can be performed, at least partially, by the ultrasound-based authenticator 420, as further described with respect to FIGS. 8 to 11.

Some hearables 102 include an active-noise-cancellation circuit 424, which enables the hearables 102 to reduce background or environmental noise. In this case, the microphone 410 used for audioplethysmography 110 can be implemented using a feedback microphone of the active-noise-cancellation circuit 424. During active noise cancellation, the feedback microphone provides feedback information regarding the performance of the active noise cancellation. During audioplethysmography 110, the feedback microphone receives an ultrasound signal, which is provided to the pre-processing module 418. In some situations, active noise cancellation and audioplethysmography 110 are performed simultaneously using the feedback microphone. In this case, the ultrasound signal received by the feedback microphone can be provided to the pre-processing module 418 and the feedback signal for active noise cancellation can be provided to the active-noise-cancellation circuit 424. Other implementations are also possible in which the microphone 410 is implemented using a feedforward microphone of the active-noise-cancellation circuit 424. In some implementations, the feedforward microphone performs passive audio sensing to provide an audio signal for denoising operations.

Some implementations of the hearable 102 can also include an auxiliary sensor 426. The auxiliary sensor 426 can be used, along with audioplethysmography 110, to perform authentication 112. Generally speaking, the auxiliary sensor 426 and audioplethysmography 110 provide different means for observing the utterances made by the user 106. While audioplethysmography 110 utilizes an ultrasound-based sensor that observes vocalization-induced deformations at the ear canal 114, the auxiliary sensor 426 can observe the same vocalization through a different channel. In some example implementations, the auxiliary sensor 426 is implemented using a voice accelerometer. In this case, the voice accelerometer observes the vocalization through bone conduction. The data provided by the auxiliary sensor 426 can be used, in conjunction with the data provided using audioplethysmography 110, to perform authentication 112, as further described with respect to FIGS. 10 and 11.

Although not explicitly shown in FIG. 4, the system medium 416 can also include a virtual assistant 202 and/or another application that utilizes authentication 112. In this case, the virtual assistant 202 and/or the application enables the user 106 to use voice controls to control an operation of the hearable 102. Different types of audioplethysmography 110 are further described with respect to FIG. 5.

Active Acoustic Sensing

Figure 5:
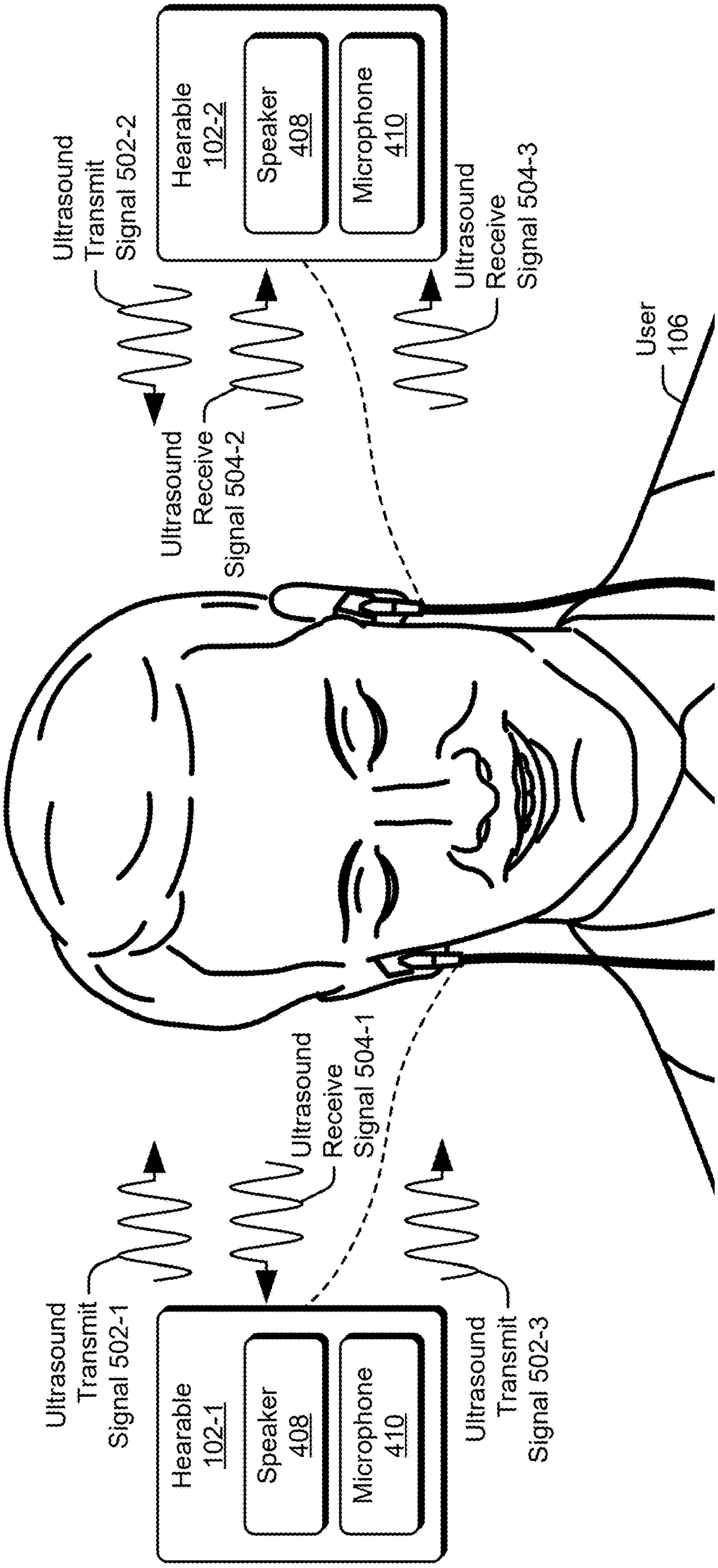
FIG. 5 illustrates example operations of two hearables.

FIG. 5 illustrates example operations of two hearables 102-1 and 102-2. In a first example operation, the hearables 102-1 and 102-2 perform single-ear audioplethysmography 110. This means that the hearables 102-1 and 102-2 independently perform audioplethysmography 110 on different cars 108 of the user 106. In this case, the first hearable 102-1 is proximate to the user 106's right ear 108, and the second hearable 102-2 is proximate to the user 106's left ear 108. Each hearable 102-1 and 102-2 includes a speaker 408 and a microphone 410. The hearables 102-1 and 102-2 can operate in a monostatic manner during the same time period or during different time periods. In other words, each hearable 102-1 and 102-2 can independently transmit and receive ultrasound signals.

For example, the first hearable 102-1 uses the speaker 408 to transmit a first ultrasound transmit 502-1, which propagates within at least a portion of the user 106's right ear canal 114. The first hearable 102-1 uses the microphone 410 to receive a first ultrasound receive signal 504-1. The first ultrasound receive signal 504-1 represents a version of the first ultrasound transmit signal 502-1 that is modified, at least in part, by the acoustic circuit associated with the right car canal 114. This modification can change an amplitude, phase, and/or frequency of the first ultrasound receive signal 504-1 relative to the first ultrasound transmit signal 502-1.

Similarly, the second hearable 102-2 uses the speaker 408 to transmit a second ultrasound transmit signal 502-2, which propagates within at least a portion of the user 106's left ear canal 114. The second hearable 102-2 uses the microphone 410 to receive a second ultrasound receive signal 504-2. The second ultrasound receive signal 504-2 represents a version of the second ultrasound transmit signal 502-2 that is modified by the acoustic circuit associated with the left ear canal 114. This modification can change an amplitude, phase, and/or frequency of the second ultrasound receive signal 504-2 relative to the second ultrasound transmit signal 502-2.

The techniques of single-ear audioplethysmography 110 can be particularly beneficial as it enables the computing device 104 to compile information from both hearables 102-1 and 102-2, which can further improve measurement confidence. For some aspects of audioplethysmography 110, it can be beneficial to analyze the acoustic channel between two cars 108, as further described below.

In a second example operation, the two hearables 102-1 and 102-2 perform two-ear audioplethysmography 110. This means that the hearables 102-1 and 102-2 jointly perform audioplethysmography 110 across two cars 108 of the user 106. In this case, at least one of the hearables 102 (e.g., the first hearable 102-1) includes the speaker 408, and at least one of the other hearables 102 (e.g., the second hearable 102-2) includes the microphone 410. The hearables 102-1 and 102-2 operate together in a bistatic manner during the same time period.

During operation, the first hearable 102-1 transmits a third ultrasound transmit 502-3 using the speaker 408. The third ultrasound transmit signal 502-3 propagates through the user 106's right ear canal 114. The third ultrasound transmit signal 502-3 also propagates through an acoustic channel that exists between the right and left cars 108. In the left ear 108, the third ultrasound transmit signal 502-3 propagates through the user 106's left ear canal 114 and is represented as a third ultrasound receive signal 504-3. The second hearable 102-2 receives the third ultrasound receive signal 504-3 using the microphone 410. The third ultrasound receive signal 504-3 represents a version of the third ultrasound transmit signal 502-3 that is modified by the acoustic circuit associated with the right ear canal 114, modified by the acoustic channel associated with the user 106's face, and modified by the acoustic circuit associated with the left ear canal 114. This modification can change an amplitude, phase, and/or frequency of the third ultrasound receive signal 504-3 relative to the third ultrasound transmit signal 502-3. In some cases, the hearable 102-2 measures the time-of-flight (ToF) associated with the propagation from the first hearable 102-1 to the second hearable 102-2. Sometimes a combination of single-ear and two-ear audioplethysmography 110 are applied to further improve measurement confidence.

The ultrasound transmit signals 502 of FIG. 5 can represent a variety of different types of signals as described above with respect to FIG. 4. In example implementations, the ultrasound transmit signal 502 can be a continuous-wave signal (e.g., a sinusoidal signal) or a pulsed signal. Some ultrasound transmit signals 502 can have a particular tone (or frequency). Other ultrasound transmit signals 502 can have multiple tones (or multiple frequencies). A variety of modulations can be applied to generate the ultrasound transmit signal 502. Example modulations include linear frequency modulations, triangular frequency modulations, stepped frequency modulations, phase modulations, or amplitude modulations. The ultrasound transmit signal 502 can be transmitted as part of a calibration procedure or a measurement procedure, as further described as part of FIG. 6.

FIG. 6 illustrates an example implementation of the hearable 102 for performing authentication 112. In the depicted configuration, the hearable 102 includes the speaker 408, the microphone 410, the analog circuit 412, the pre-processing module 418, the ultrasound-based authenticator 420, and the calibration module 422. Other implementations of the hearable 102, however, are also possible in which the hearable 102 does not include the calibration module 422 to reduce processing power requirements. In this case, the pre-processing module 418 can perform aspects of frequency selection as further described below to improve the signal-to-noise ratio for audioplethysmography 110.

Outputs of the speaker 408 and the microphone 410 are coupled to inputs of the analog circuit 412. The pre-processing module 418 has inputs that are coupled to outputs of the analog circuit 412. The pre-processing module 418 also has an output that is coupled to inputs of the ultrasound-based authenticator 420 and the calibration module 422. In an example implementation, the pre-processing module 418 includes at least one in-phase and quadrature mixer (I/Q mixer) and at least one filter. The in-phase and quadrature mixer performs frequency down-conversion and can be implemented using at least two mixers, at least one phase shifter, and at least one combiner (e.g., a summation circuit). The filter attenuates intermodulation products that are generated by the in-phase and quadrature mixer. In an example implementation, the filter is implemented using a low-pass filter.

The pre-processing module 418 can optionally include at least one frequency selector. The frequency selector can identify and select one or more tones (or carrier frequencies) that provide a high-quality signal for later processing. The frequency selector can further pass the selected tones to other processing modules (e.g., the ultrasound-based authenticator 420) and filter (or attenuate) other tones that are not selected. The frequency selector can be implemented in a similar manner as the calibration module 422, which is further described below.

The ultrasound-based authenticator 420 can optionally have another input that is coupled to the microphone 410 (or another microphone not shown). Also, the ultrasound-based authenticator 420 can optionally be coupled to one or more other sensors (e.g., the auxiliary sensor 426 and/or an on-head detector). Example implementations of the ultrasound-based authenticator 420 are further described with respect to FIGS. 10 and 11. With the ultrasound-based authenticator 420, the hearable 102 performs a measurement procedure that includes performing authentication 112 using audioplethysmography 110.

The calibration module 422 has an output that is coupled to the speaker 408. The calibration module 422 includes at least one frequency selector. The frequency selector can include at least one amplitude detector, at least one phase detector, at least one quality detector, and at least one comparator. Using the frequency selector, the calibration module 422 can perform a calibration procedure that determines appropriate characteristics (e.g., waveform or signal characteristics) of ultrasound transmit signals 502 to improve audioplethysmography 110 (e.g., to enhance the performance of authentication 112). The calibration procedure enables audioplethysmography 110 to take into account the wear of the hearable 102 (e.g., the position of the hearable 102 relative to the ear canal 114) and the physical structure of the ear canal 114 to determine a transmission frequency that can increase sensitivity.

Consider an example operation of the hearable 102 in accordance with single-ear audioplethysmography 110. In this example, the hearable 102 includes the calibration module 422. With the calibration module 422, the hearable 102 can perform the calibration procedure prior to performing a measurement procedure. In some circumstances, the hearable 102 can perform on-head detection (or in-ear detection) by detecting the presence of the seal 116 and initiating the calibration procedure and/or the measurement procedure based on a determination that on-head detection is "true." In other circumstances, the hearable 102 can initiate the calibration procedure based on a specified schedule or a timer, which can be controlled by the user 106 via the computing device 104. The calibration procedure and the measurement procedure are further described below.

During both the calibration procedure and the measurement procedure, the speaker 408 transmits the ultrasound transmit signal 502 and the microphone 410 receives the ultrasound receive signal 504. During the calibration procedure, the ultrasound transmit signal 502 and the ultrasound receive signal 504 can have tones 602-1 to 602-M, where M represents a positive integer. The multiple tones 602-1 to 602-M can be transmitted in parallel or in series over a given time interval. In this case, the ultrasound transmit signal 502 can have a particular bandwidth on the order of several kilohertz. For example, the ultrasound transmit signal 502 can have a bandwidth of approximately 4, 5, 6, 8, 10, 16, or 20 kHz. In example implementations, the ultrasound transmit signal 502 is transmitted over multiple seconds, such as 2, 3, 4, 6, or more seconds. A duration of each tone 602 can be evenly divided over a total duration of the ultrasound transmit signal 502.

In an example implementation, the ultrasound transmit signal 502 for the calibration procedure can have seven tones 602 (e.g., M equals 7). In some cases, the tones 602 are evenly distributed across an interval. For example, the tones 602 can be in 1 kHz increments between 32 kHz and 38 kHz (e.g., at approximately 32, 33, 34, 35, 36, 37, and 38 kHz). The term "approximately" means that the tones 602 can be within 5% of a given value or less (e.g., within 3%, 2%, or 1% of the given value).

An amplitude of the calibration procedure's ultrasound transmit signal 502 can be approximately the same across the tones 602-1 to 602-M. In this manner, power is evenly distributed across each tone 602. The quantity of tones 602 (e.g., M) can be determined based on an output power of the speaker 408. Increasing the quantity of tones 602 can increase a likelihood that the hearable 102 can support authentication 112 across various conditions including user wear and a physical structure of the user 106's ear canal 114. However, an amplitude of the ultrasound transmit signal 502 can be limited across these tones 602 based on the output power of the speaker 408. Thus, the quantity of tones 602 can be optimized based on an amount of output power that is available for audioplethysmography 110.

During the measurement procedure, the ultrasound transmit signal 502 and the ultrasound receive signal 504 can have selected tones 604-1 to 604-N, where N represents a positive integer that is less than or equal to M. The selected tones 604-1 to 604-N can represent a subset (sometimes a proper subset) of the tones 602-1 to 602-M. The selected tones 604 can be transmitted in parallel or in series over a given time interval.

An amplitude of the measurement procedure's ultrasound transmit signal 502 can be approximately the same across the selected tones 604-1 to 604-N. In this manner, power is evenly distributed across each selected tone. The amplitude of the measurement procedure's ultrasound transmit signal 502 can be higher than the amplitude of the calibration procedure's ultrasound transmit signal 502 because the available output power is distributed across fewer tones. Additionally or alternatively, a duration of each of the selected tones 604 of the measurement procedure's ultrasound transmit signal 502 can be longer than the duration of the tones 602 of the calibration procedure's ultrasound transmit signal 502. The higher amplitude and/or the longer duration can further improve the signal-to-noise ratio performance of the hearable 102 for audioplethysmography 110. By using a few selected tones 604 that were determined to improve signal-to-noise ratio performance, the measurement procedure can achieve a higher level of accuracy and sensitivity for authentication 112.

The analog circuit 412 performs analog-to-digital conversion to generate a digital transmit signal 606 and a digital receive signal 608 based on the ultrasound transmit signal 502 and the ultrasound receive signal 504, respectively. The pre-processing module 418 performs frequency downconversion and demodulation to generate at least one pre-processed signal 610 based on the digital transmit signal 606 and the digital receive signal 608. The pre-processing module 418 can also apply filtering to generate the pre-processed signal 610.

Optionally, as part of the calibration procedure, the calibration module 422 processes the pre-processed signal 610 to determine the selected tones 604-1 to 604-N. The selected tones 604-1 to 604-N can improve performance of audioplethysmography 110 during the measurement procedure. To determine the selected tones 604-1 to 604-N, the calibration module 422 extracts the amplitude and/or phase of the pre-processed signal 610 using the amplitude detector and the phase detector, respectively. The quality detector of the calibration module 422 measures quality metrics for each tone (or frequency) of the pre-processed signal 610 and for each of the characteristics (e.g., amplitude and/or phase). Example quality metrics can include peak-to-average ratios and/or signal-to-noise ratios. The peak-to-average ratio represents a peak intensity within a frequency range of interest divided by an average intensity within this frequency range. A higher quality metric indicates a higher-quality signal, or more generally, better performance for audioplethysmography 110.

The comparator of the calibration module 422 can evaluate the quality metrics with respect to a threshold. In an example implementation, the comparator determines the selected tones 604-1 to 604-N for a subsequent measurement procedure based on the frequencies associated with the quality metrics that are greater than or equal to a threshold. Additionally or alternatively, the comparator can evaluate the quality metrics with respect to each other. In an example implementation, the comparator determines one of the selected tones based on a frequency with the highest quality metric across the amplitude. Also, the comparator can determine one of the selected tones 604-1 to 604-N based on a frequency with the highest quality metric across the phase. In other implementations, the comparator can determine a single selected tone based on a frequency having the highest quality metric associated with either the amplitude or the phase.

In general, the calibration module 422 enables the selected tones 604-1 to 604-N to be dynamically adjusted prior to the measurement procedure based on a current environment, which can account for a wear of the hearable 102 (e.g., a current insertion depth and/or rotation), a physical structure of the user 106's ear canal 114, and a response characteristic of the hearable 102 (e.g., speaker, microphone, and/or housing). In this manner, the calibration module 422 can improve the signal-to-noise ratio performance of the hearable 102 for the measurement procedure. The calibration module 422 can also determine which tones 604 generate ultrasound receive signals 504 with desired characteristics for authentication 112. In general, the calibration procedure can be performed whether or not the user 106 is speaking.

The calibration module 422 communicates the selected tones 604-1 to 604-N to the speaker 408 using a control signal. The speaker 408 accepts the control signal that identifies the selected tones 604-1 to 604-N and can transmit a subsequent ultrasound transmit signal 502 for authentication 112 using the selected tones 604-1 to 604-N. With the calibration procedure, the hearable 102 can dynamically adjust the transmission frequency (e.g., one or more carrier frequencies) each time the seal 116 is formed (e.g., based on the wear of the hearable 102) and based on the unique physical structure of the ear 108. Through this calibration procedure, the hearables 102 on different cars 108 may operate with one or more different ultrasound frequencies.

As part of the measurement procedure, the ultrasound-based authenticator 420 can perform aspects of authentication 112 using the pre-processed signal 610 to generate an authentication indicator 612. The authentication indicator 612 can indicate whether or not the authentication 112 is successful. The authentication indicator 612 can be communicated to the computing device 104 (e.g., to the virtual assistant 202 and/or to the application 306). Additionally or alternatively, the authentication indicator 612 can be used to control an operation of the hearable 102 and/or the computing device 104.

In FIG. 6, the calibration procedure and the measurement procedure are described as individual procedures that occur at different time intervals. In particular, the calibration procedure occurs before the measurement procedure. This enables the ultrasound transmit signal 502 for the measurement procedure to be transmitted with fewer tones than the ultrasound transmit signal 502 used for the calibration procedure, which can increase signal-to-noise ratio performance for audioplethysmography 110. In some implementations, however, the hearable 102 can have sufficient output power to perform the measurement procedure with the multiple tones 602-1 to 602-M using a single ultrasound transmit signal 502. In this case, aspects of the calibration module 422 can be integrated within the pre-processing module 418 via a frequency selector. This frequency selector can effectively pass the selected tones 604-1 to 604-N to the ultrasound-based authenticator 420.

In some implementations, the microphone 410 (or another microphone not shown) can perform passive audio sensing to detect an over-the-air voice signal 614 during the measurement process. The over-the-air voice signal 614 can include the user 106's vocalization as well as any noise that is present within the external environment. During passive audio sensing, the microphone 410 generates an audio voice signal 616, which can include the vocalization made by the user 106. The audio voice signal 616 includes information corresponding to a voice signature of the user 106. The hearable 102 can optionally utilize the audio voice signal 616 to further enhance the authentication 112, as further described with respect to FIGS. 10 and 11.

The pre-processed signal 610 that is provided to the ultrasound-based authenticator 420 has information that can be used to generate an ultrasound-based voice signature 618, which can be unique to each person. In some implementations, the pre-processed signal 610 can be used as the ultrasound-based voice signature 618. In other implementations, additional signal-processing techniques can modify the pre-processed signal 610 to generate the ultrasound-based voice signature 618. Example signal-processing techniques can include filtering and/or applying a Fourier transform to generate a spectrogram of the pre-processed signal 610.

Figure 10:
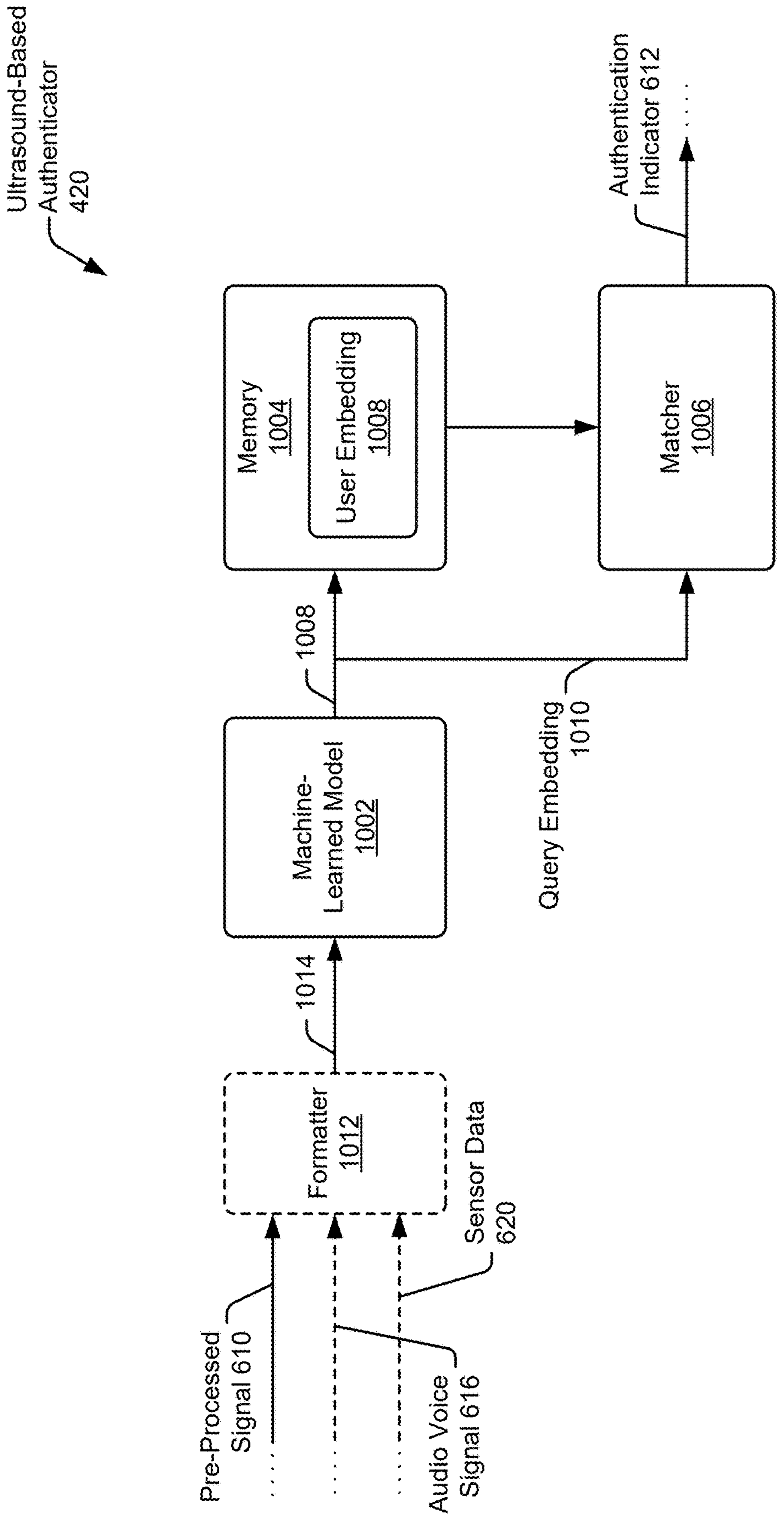
FIG. 10 illustrates an example implementation of an ultrasound-based authenticator.
Figure 11:
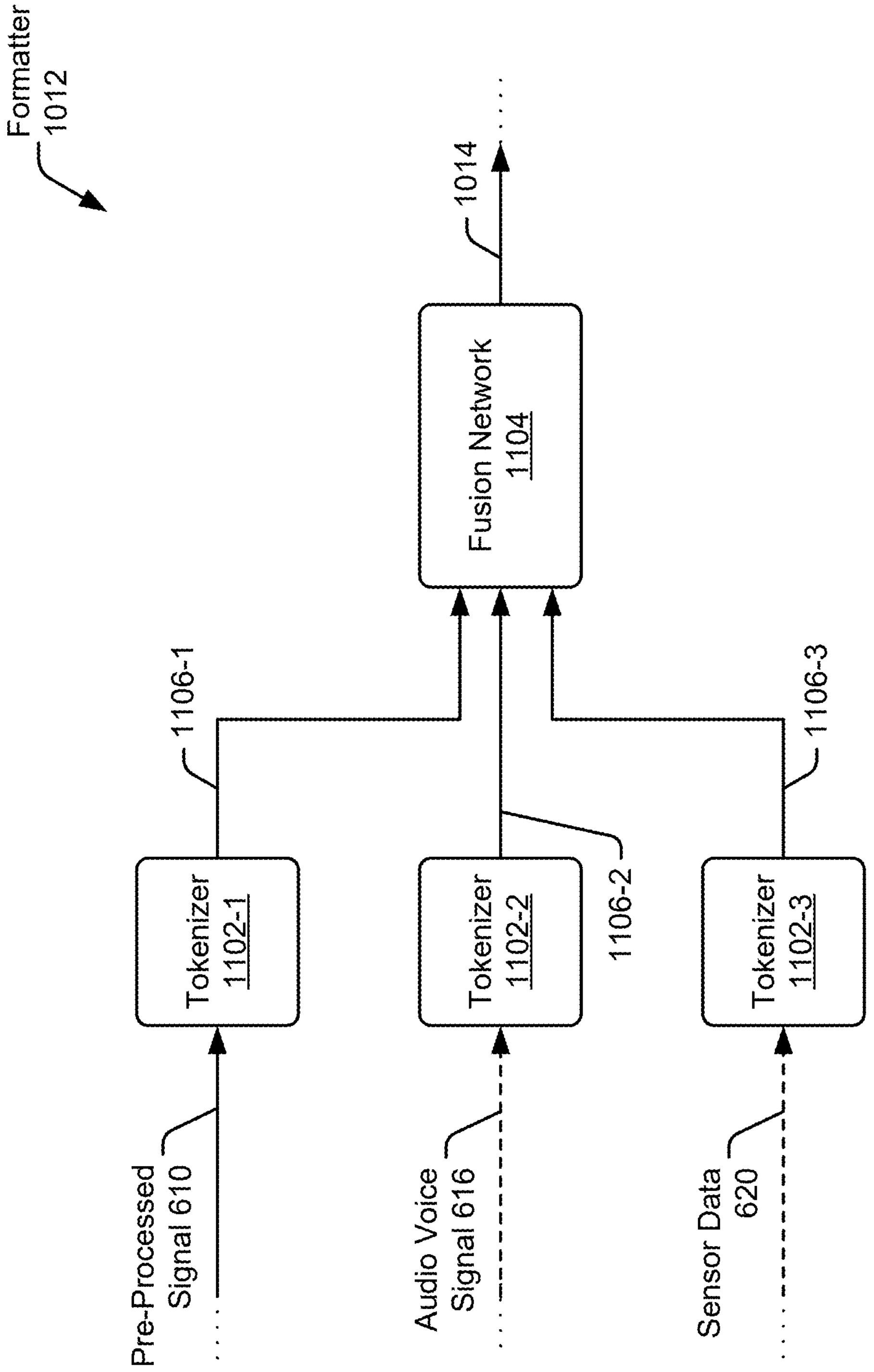
FIG. 11 illustrates an example implementation of a formatter of an ultrasound-based authenticator.

Some implementations of the hearable 102 can optionally utilize sensor data 620 generated by the auxiliary sensor 426 for authentication 112, as further described with respect to FIGS. 10 and 11. In general, the ultrasound-based authenticator 420 can perform authentication 112 using at least the ultrasound-based voice signature 618 (e.g., at least the pre-processed signal 610 generated via audioplethysmography 110). Some implementations of the ultrasound-based authenticator 420 can also utilize the audio voice signal 616 and/or the sensor data 620 to further enhance authentication 112. Utilizing one or more of the audio voice signal 616 and/or the sensor data 620 in addition to the ultrasound-based voice signature 618 can improve, for instance, the false acceptance rate and/or the spoof acceptance rate in some cases. The ultrasound-based voice signature 618 is further described with respect to FIG. 7.

Authentication

Figure 7:
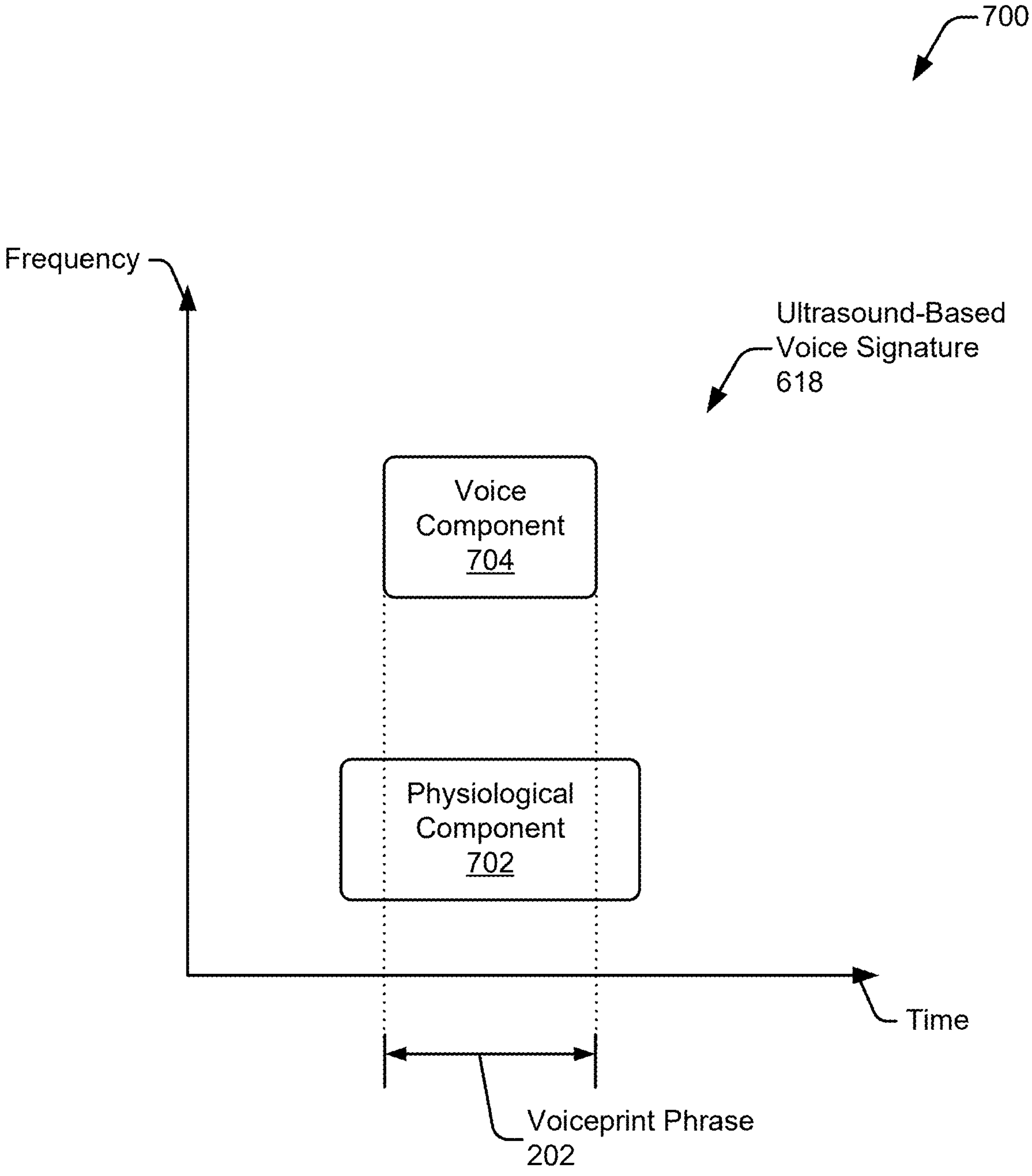
FIG. 7 illustrates an example ultrasound-based voice signature.

FIG. 7 illustrates an example ultrasound-based voice signature 618. A graph 700 depicts frequency over time. During a particular period of time, the user 106 vocalizes (e.g., generates the speech 208), which causes the ear canal 114 of the user 106 to deform. The deformation in the ear canal 114 is sensed using the ultrasound receive signal 504. In particular, the deformation causes waveform characteristics of the ultrasound receive signal 504 to be modified relative to the ultrasound transmit signal 502. The modified waveform characteristics form aspects of the ultrasound-based voice signature 618, which includes a physiological component 702 and a voice component 704.

The physiological component 702 represents muscle movements that the user 106 makes to vocalize the speech 208. Example muscle movements can include jaw movements and/or tongue movements. Additionally or alternatively, the muscle movements can include auxiliary movements that the user 106 performs while speaking, such as blinking, rolling their eyes, or shaking their head. Other auxiliary muscle movements can also include the user 106's heartbeat and/or respiration rate. The muscle movements can occur over a longer duration than a vocalization of the speech 208, as shown in the graph 700. This can account for the user 106 positioning their muscles in preparation for vocalizing and repositioning their muscles after vocalizing (e.g., repositioning their muscles to a neutral or a relaxed position). In general, the physiological component 702 is associated with frequencies of the ultrasound receive signal 504 that are less than 50 Hz, including frequencies at approximately 40, 30, 20, or 10 Hz. The term "approximately" means that the frequencies can be within 5% of a given value or less (e.g., within 3%, 2%, or 1% of the given value).

The voice component 704 represents the speech 208 and can be sensitive to both content (e.g., the particular word spoken) and tonality (e.g., pitch, rhythm, and/or intensity). The voice component 704 includes additional contextual information about a channel that is formed between the user 106's vocal chords and the ear canal 114. Along this channel, bone conduction enables vibrations associated with the user 106's voice to cause deformations within the ear canal 114. The voice component 704 is associated with frequencies of the ultrasound receive signal 504 that are greater than approximately 50 Hz, including frequencies between approximately 100 Hz and 2 kilohertz (kHz) (e.g., between approximately 100 Hz and 1 kHz, between approximately 100 Hz and 500 Hz). The term "approximately" means that the frequencies can be within 5% of a given value or less (e.g., within 3%, 2%, or 1% of the given value). In some cases, the frequencies associated with the voice component 704 are significantly higher than the frequencies associated with the physiological component 702 (e.g., are approximately 2, 3, 5 or 10 times greater).

The voice component 704 is associated with the vocalization (e.g., the speech 208). In some implementations, the hearable 102 can analyze the voice component 704 to recognize the speech 208. In general, the voice component 704 can be similar to, but orthogonal to, a voice component that is present within the audio voice signal 616 and/or the sensor data 620. This is because the voice component 704 within the ultrasound receive signal 504 is caused by a different physical phenomenon involving the deformation of the ear canal 114. In contrast, the voice component within the audio voice signal 616 is caused by the passage of air through the body, the shape of the user 106's mouth, the force of aspiration, or the movement of the tongue. The voice component within the sensor data 620 can be caused by other means, such as bone conduction in the case of the auxiliary sensor 426 being a voice accelerometer.

To improve authentication performance and anti-spoofing capabilities of the hearable 102, the ultrasound-based authenticator 420 analyzes both the physiological component 702 and the voice component 704 of the ultrasound-based voice signature 618, as further described with respect to FIG. 10. This multi-component aspect can significantly improve authentication performance in terms of the spoof acceptance rate and/or the false acceptance rate. The voice component 704 of the ultrasound-based voice signature 618 can be particularly challenging to spoof due to the unique channel formed between the vocal chords and the ear canal 114. With active acoustic sensing, the hearable 102 can realize a target spoof acceptance rate and a target false acceptance rate to provide a desired level of security for authentication purposes.

Although the ultrasound-based voice signature 618 does not directly map a geometry (or a morphology) of the ear canal 114, the geometry of the user 106's ear canal 114 can indirectly influence the ultrasound-based voice signature 618. The ultrasound-based voice signature 618 can be dependent upon the placement of the hearable 102 within the ear canal 114 (e.g., based on the insertion depth and/or orientation of the hearable 102). The ultrasound-based authenticator 420 can be designed and/or trained to take into account variations of the placement of the hearable 102 to enable authentication 112 to be performed with the hearable 102 positioned in a variety of different ways. Example operations of the ultrasound-based authenticator 420 are further described with respect to FIGS. 8 and 9.

Figure 8:
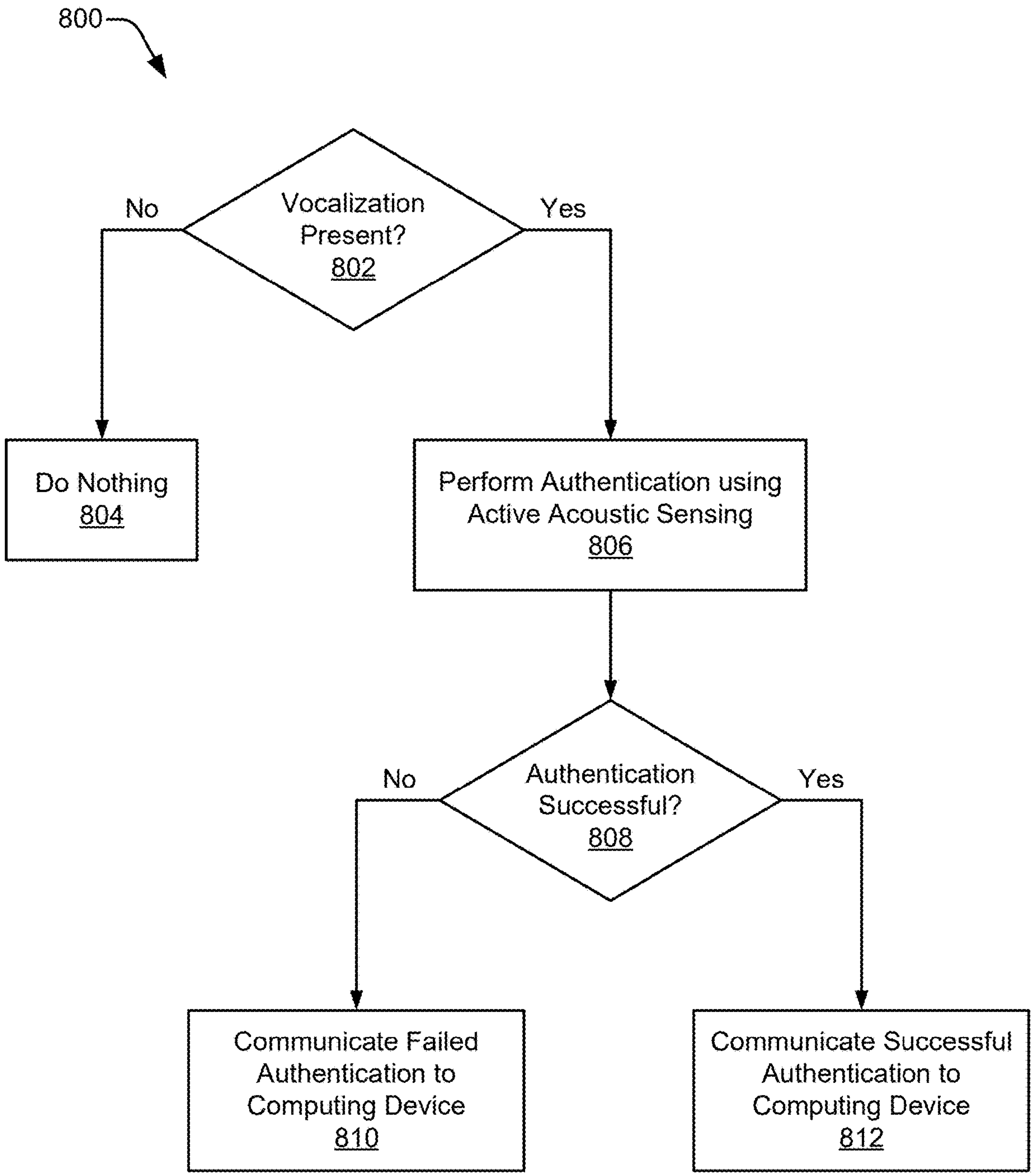
FIG. 8 illustrates a first example scheme implemented by an ultrasound-based authenticator to perform aspects of authentication using active acoustic sensing.

FIG. 8 illustrates an example scheme 800 implemented by the ultrasound-based authenticator 420. At 802, the ultrasound-based authenticator 420 determines if a vocalization is present. In some implementations, the ultrasound-based authenticator 420 can directly detect the vocalization based on the pre-processed signal 610 (e.g., based on the voice component 704). In other implementations, an indication that the user 106 is speaking can be provided to the ultrasound-based authenticator 420 using another sensor of the hearable 102, such as the microphone 410 or a voice accelerometer. If a determination is made that the vocalization is not present (e.g., the vocalization is absent), the ultrasound-based authenticator 420 takes no further action, as indicated at 804. Otherwise, if a determination is made that the vocalization is present, the process continues at 806.

At 806, the ultrasound-based authenticator 420 performs authentication 112 using active acoustic sensing. In particular, the ultrasound-based authenticator 420 analyzes the ultrasound-based voice signature 618 associated with the vocalization. At 808, the ultrasound-based authenticator 420 determines whether or not the authentication 112 is successful. If the ultrasound-based voice signature 618 is not authenticated, the ultrasound-based authenticator 420 can generate the authentication indicator 612 to indicate that the authentication 112 failed. This can cause the hearable 102 to communicate the failed authentication to the computing device 104. In some cases, the computing device 104 can display a message indicating that the authentication failed. The computing device 104 can also perform other actions, such as causing the virtual assistant 202 to be in the inactive state 204, as shown in FIG. 2-1. If authentication fails multiple times in a short time period, the computing device 104 may attempt to inform the user 106 of a possible spoofing attack. For example, the computing device 104 can send an email to the user 106 notifying them of the multiple failed authentication attempts.

If the ultrasound-based voice signature 618 is authenticated at 808, the ultrasound-based authenticator 420 can generate the authentication indicator 612 to indicate that the authentication 112 is successful. This can cause the hearable 102 to communicate the successful authentication to the computing device 104, as indicated at 812. In some examples, the computing device 104 can display a message indicating that the authentication was successful. The computing device 104 can also perform other actions, such as causing the virtual assistant 202 to be in the active state 212, as shown in FIG. 2-1.

In some cases, authentication 112 can be continuously performed using the scheme 800. In particular, the authentication 112 can be performed anytime the user 106 talks. In some cases, each vocalization made by the user 106 can be processed using the ultrasound-based authenticator for authentication 112. In general, authentication 112 can be bypassed during time periods in which the person wearing the hearable 102 is not speaking. This can enable the hearable 102 to conserve power and computer-processing resources. Optionally, the ultrasound-based authenticator 420 can switch to another authentication technique after authentication is successful at 808, as further described with respect to FIG. 9.

Figure 9:
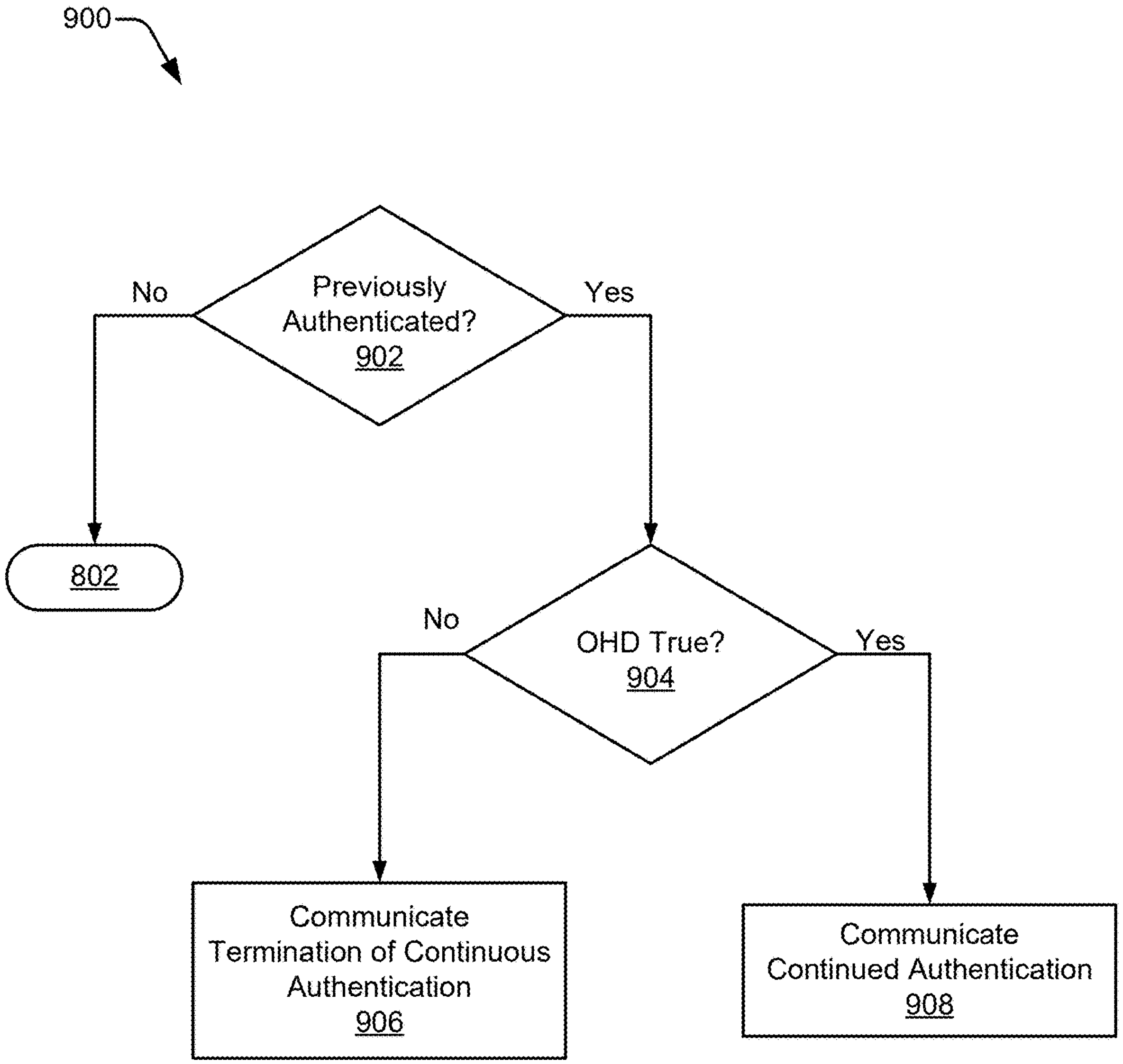
FIG. 9 illustrates a second example scheme implemented by an ultrasound-based authenticator to perform aspects of authentication using active acoustic sensing.

FIG. 9 illustrates a second example scheme 900 implemented by an ultrasound-based authenticator 420 to perform aspects of authentication 112 using active acoustic sensing. This scheme 900 can be implemented after the ultrasound-based authenticator 420 successfully authenticates the user 106 at step 808 in FIG. 8. The scheme 900 provides an alternative technique for providing continuous authentication.

At 902, the ultrasound-based authenticator 420 determines whether or not authentication 112 was previously successful since a time that the user 106 put on the hearable 102. If authentication 112 has yet to be performed or previously failed, the process returns to step 802 in FIG. 8. Otherwise, if authentication 112 was previously successful since the user 106 put on the hearable 102, the process continues at 904.

At 904, the ultrasound-based authenticator 420 determines whether or not on-head detection (OHD) is true. In some example implementations, the ultrasound-based authenticator 420 can determine that on-head detection is true based on the pre-processed signal 610. In particular, the ultrasound-based authenticator 420 can analyze the pre-processed signal 610 to detect a heartbeat and/or a respiration rate of the user 106. If the heartbeat and/or the respiration rate can be measured using the pre-processed signal 610, this indicates that on-head detection is true. Otherwise, if the heartbeat and/or the respiration cannot be measured or an undetected, this indicates that on-head detection is false.

In other example implementations, the ultrasound-based authenticator 420 can receive information from a sensor regarding whether on-head detection is true or false. This sensor can directly detect on-head detection, such as by using an infrared sensor, or an indirectly detect on-head detection by detecting another biometric of the user 106 (e.g., including the heartbeat, respiration rate, and/or temperature of the user 106).

If the on-head detection is false, the ultrasound-based authenticator 420 can generate the authentication indicator 612 to indicate that authentication is false. This can cause the hearable 102 to communicate, to the computing device 104, that continuous authentication has been terminated, as indicated at 906.

If on-head detection is true, the ultrasound-based authenticator 420 can generate the authentication indicator 612 to indicate that authentication is true. This can cause the hearable 102 to communicate, to the computing device 104, that the person wearing the hearable 102 is still authenticated, as indicated at 908. The scheme 900 described in FIG. 9 can conserve power and/or utilize less computer-processing resources compared to the scheme 800 described in FIG. 8. In this manner, the scheme 900 enables continued authentication to occur using on-head detection after authentication 112 using the scheme 800 is established. An example implementation of the ultrasound-based authenticator 420 is further described with respect to FIG. 10.

FIG. 10 illustrates an example implementation of the ultrasound-based authenticator 420. In the depicted configuration, the ultrasound-based authenticator 420 at least includes one machine-learned model 1002. Although not shown in FIG. 10, the ultrasound-based authenticator 420 can also include additional logic or a state machine to implement aspects of the schemes 800 and 900 of FIGS. 8 and 9. The ultrasound-based authenticator 420 can also include other machine-learned models and/or signal-processing techniques that can perform voice-activity detection, on-head detection, and/or speech recognition based on the pre-processed signal 610. Other implementations of the ultrasound-based authenticator 420 are also possible in which the ultrasound-based authenticator 420 employs signal-processing techniques instead of machine learning to perform authentication 112 based at least one the pre-processed signal 610.

The machine-learned model 1002 is implemented using one or more neural networks. A neural network includes a group of connected nodes (e.g., neurons or perceptrons), which are organized into one or more layers. As an example, the machine-learned model 1002 includes a deep neural network, which includes an input layer, an output layer, and one or more hidden layers positioned between the input layer and the output layers. The nodes of the deep neural network can be partially-connected or fully-connected between the layers.

In some implementations, the neural network is a recurrent neural network (e.g., a long short-term memory (LSTM) neural network) with connections between nodes forming a cycle to retain information from a previous portion of an input data sequence for a subsequent portion of the input data sequence. In other cases, the neural network is a feed-forward neural network in which the connections between the nodes do not form a cycle. In still other cases, the neural network can include a time delay neural network (TDNN). Additionally or alternatively, the machine-learned model 1002 includes another type of neural network, such as a convolutional neural network. The machine-learned model 1002 can also include one or more types of classification models. An example implementation of the machine-learned model 1002 can have an ECAPA-TDNN architecture. The machine-learned model 1002 can be implemented using a single-channel-input machine-learned model or a multi-channel-input machine-learned model. The single-channel-input machine-learned model accepts information (e.g., the pre-processed signal 610) from a single hearable 102. The multi-channel-input machine-learned model accepts information (e.g., the pre-processed signals 610) from multiple hearables 102 (e.g., hearables 102-1 and 102-2 of FIG. 5).

In general, the machine-learned model 1002 is trained using supervised learning to extract features from at least a version of the ultrasound receive signal 504 for authentication 112. The supervised learning can use simulated (e.g., synthetic) data or measured (e.g., real) data for training purposes. The supervised learning can include data that accounts for different positions of the hearable 102 relative to the ear canal 114. In this way, the machine-learned model 1002 can successfully perform authentication 112 regardless of an insertion depth and/or an orientation of the hearable 102.

The machine-learned model 1002 can be designed and trained to perform speaker embedding. Speaker embedding enables the machine-learned model 1002 to extract features from at least the pre-processed signal 610 (e.g., features from the physiological component 702 and the voice component 704 of the ultrasound-based voice signature 618) that enable a user 106 to be authenticated. In some implementations, the machine-learned model 1002 may also be designed and trained to perform content embedding. Content embedding enables the machine-learned model 1002 to extract features from at least the pre-processed signal 610 for speech recognition. In summary, content embedding enables the ultrasound-based authenticator 420 to understand what was vocalized while speaker embedding enables the ultrasound-based authenticator 420 to determine if the person generating the vocalization is an authorized user of the hearable 102 and/or an authorized user of the computing device 104.

Consider an example in which the machine-learned model 1002 is implemented with the ECAPA-TDNN architecture. The example ultrasound-based authenticator 420 shown in FIG. 10 also includes memory 1004 and at least one matcher 1006. The memory 1004 can be implemented as one or more computer-readable storage media, which may or may not be part of the system medium 416. The memory 1004 stores user embedding 1008, which is generated by the machine-learned model 1002 during operation. Within the ECAPA-TDNN architecture, the user embedding 1008 is generated in a last fully-connected layer prior to performing classification or a softmax function. The user embedding 1008 is a vector that includes features of at least the ultrasound-based voice signature 618. These features can be used to identify and authenticate the user 106. Each aspect of the ultrasound-based voice signature 618 (e.g., each of the voice component 704 and the physiological component 702) contribute to at least a portion of the features represented in the user embedding 1008. For implementations in which the ultrasound-based authenticator 420 also processes the audio voice signal 616 and/or the sensor data 620, the user embedding 1108 can also include features of the audio voice signal 616 and/or features of the sensor data 620.

During an enrollment phase (e.g., a setup or an initialization phase), the machine-learned model 1002 generates the user embedding 1008 based on the pre-processed signal 610 (and optionally based on the audio voice signal 616 and/or the sensor data 620). In some instances, the user 106 can vocalize a unique phrase during the enrollment phase. This enables the ultrasound-based authenticator 420 to generate the user embedding 1008 to represent the content of the user 106's speech 208. Additionally or alternatively, the user 106 can speak any phrase (e.g., talk normally) during the enrollment phase. This enables the ultrasound-based authenticator 420 to generate the user embedding 1008 to represent a manner in which the user 106 speaks (e.g., based on tonality and/or pitch). The memory 1004 stores the user embedding 1008 so that it can be referenced for authenticating the user 106.

During normal operation, the machine-learned model 1002 generates the user embedding 1008 based on the pre-processed signal 610 (and optionally based on the audio voice signal 616 and/or the sensor data 620). The currently-generated user embedding 1008, which can be referred to as a query embedding 1010, is passed to the matcher 1006. As described above with respect to the enrollment phase, the query embedding 1010 can represent the content of the user 106's speech 208 and/or can represent the manner in which the user 106 speaks.

The matcher 1006 compares the query embedding 1010 to the previously-stored user embedding 1008 in the memory 1004. In some implementations, the matcher 1006 determines an amount that the query embedding 1010 differs from the user embedding 1008 (e.g., determines a distance between the query embedding 1010 and the user embedding 1008). If the difference is sufficiently small (e.g., less than a predetermined threshold), the matcher 1006 generates the authentication indicator 612 to indicate that the speaker is an authenticated user (e.g., to indicate that the authentication is successful). Otherwise, if the difference is too large (e.g., greater than the predetermined threshold), the matcher 1006 generates the authentication indicator 612 to indicate that the speaker is not authenticated (e.g., to indicate that the authentication has failed).

In some implementations, the ultrasound-based authenticator 420 optionally includes a formatter 1012. The formatter generates formatted data 1014 based at least on the pre-processed signal 610 (and optionally based on the audio voice signal 616 and/or the sensor data 620). In a first example, the formatter 1012 generates Fourier coefficients (e.g., mel-frequency cepstral coefficients (MFCCs)) for the pre-processed signal 610, the audio voice signal 616, the sensor data 620, or some combination thereof. In a second example, the formatter 1012 short-time Fourier transforms of the pre-processed signal 610, the audio voice signal 616, the sensor data 620, or some combination thereof. In general, these formatted inputs are passed as inputs to the machine-learned model 1002.

In some cases, the formatter 1012 combines the pre-processed signal 610, the audio voice signal 616, and/or the sensor data 620 (or formatted versions thereof) together. For instance, the formatter 1012 can stack the pre-processed signal 610, the audio voice signal 616, and/or the sensor data 620 (e.g., stack the coefficients) to provide single-channel input data to the machine-learned model 1002. In other cases, the formatter 1012 provides the pre-processed signal 610, the audio voice signal 616, and/or the sensor data 620 (or formatted versions thereof) as separate inputs (e.g., as multi-channel input data) to the machine-learned model 1002. Another example implementation of the formatter 1012 is further described with respect to FIG. 11.

FIG. 11 illustrates an example implementation of the formatter 1012. In the depicted configuration, the formatter 1012 includes tokenizers 1102-1, 1102-2, and 1102-3, and a fusion network 1104. The tokenizers 1102-1, 1102-2, and 1102-3 respectively convert the pre-processed signal 610, the audio voice signal 616, and the sensor data 620 into smaller parts (e.g., into tokens 1106-1, 1106-2, and 1106-3, respectively). The fusion network 1104 combines the tokens 1106-1, 1106-2, and/or 1106-3 together to generate the formatted data 1014. For other implementations in which the ultrasound-based authenticator 420 does not analyze the audio voice signal 616 or the sensor data 620, the formatter 1012 can be implemented without the corresponding tokenizers 1102-2 and/or 1102-3.

Example Methods

Figure 12:
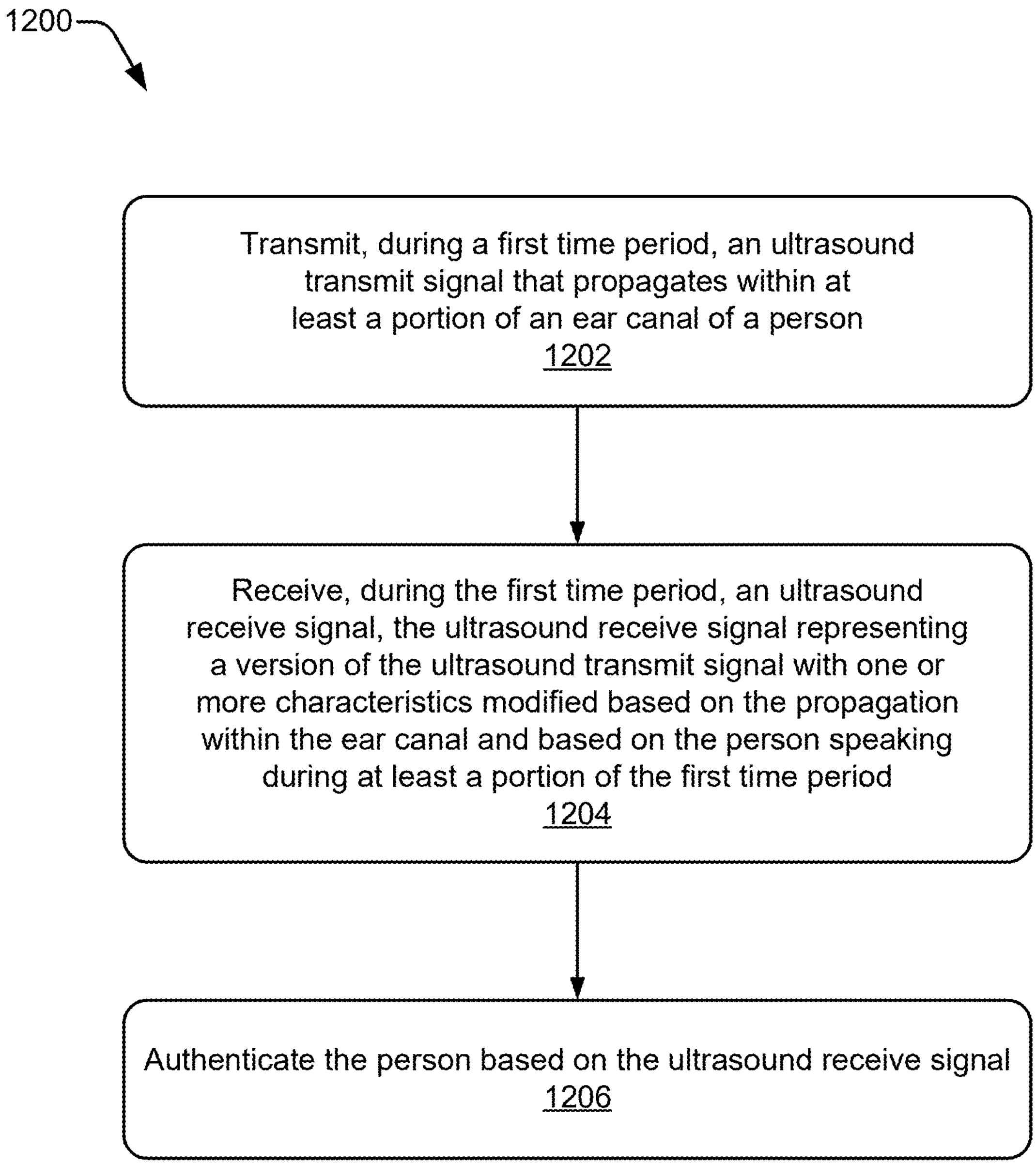
FIG. 12 illustrates an example method for performing authentication using active acoustic sensing.
Figure 13:
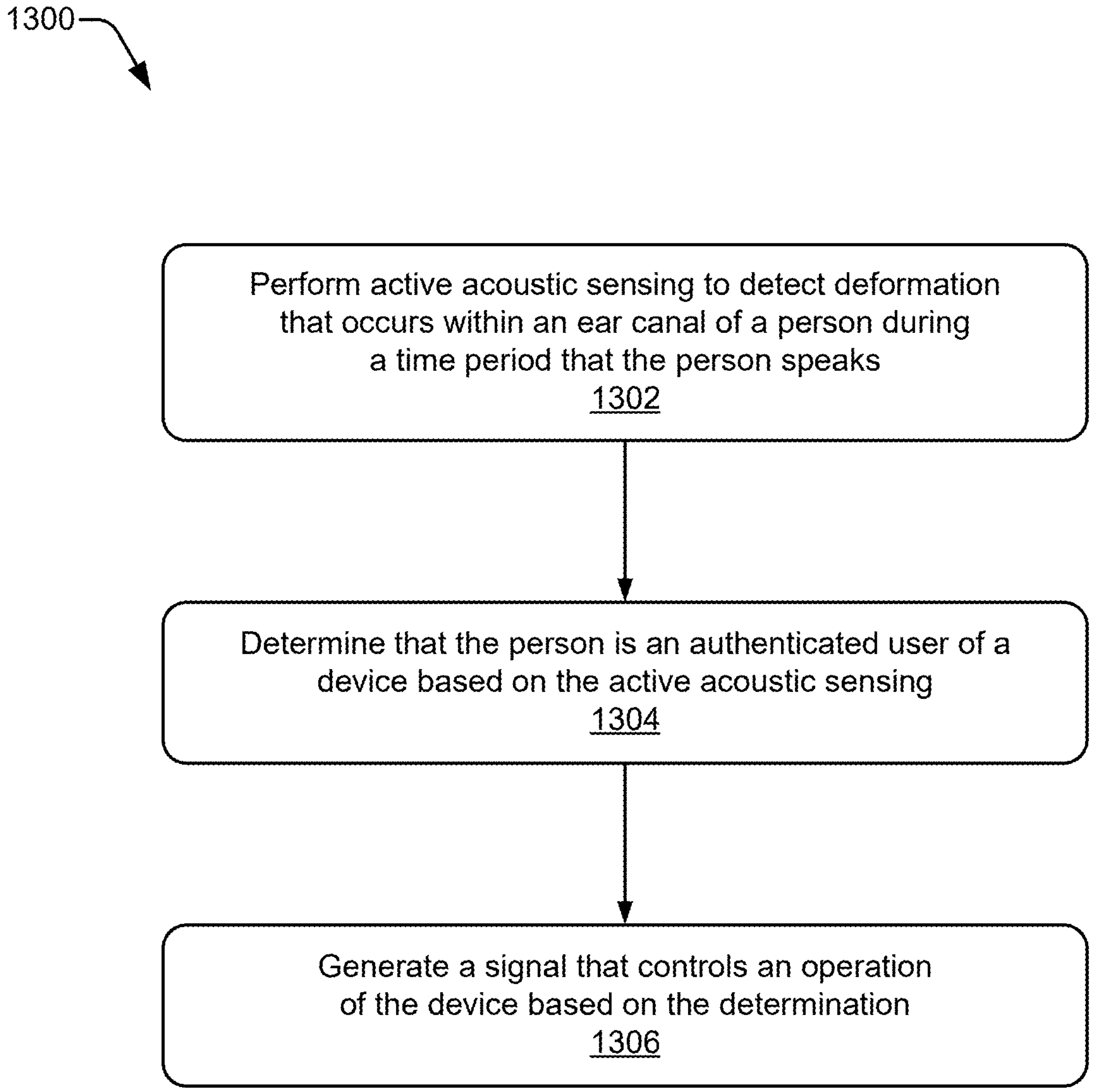
FIG. 13 illustrates another example method for performing authentication using active acoustic sensing.

FIGS. 12 and 13 depict example methods 1200 and 1300 for implementing aspects of authentication 112 using active acoustic sensing. Methods 1200 and 1300 are shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environments 100 and 200 of FIGS. 1 and 2, and entities detailed in FIGS. 3 and 4, reference to which is made for example only. The techniques are not limited to performance by one entity or multiple entities operating on one device.

At 1202, an ultrasound transmit signal is transmitted during a first time period. The ultrasound transmit signal propagates within at least a portion of an ear canal of a person. For example, the transducer 406 (or speaker 408) of the hearable 102 transmits the ultrasound transmit signal 502. The ultrasound transmit signal 502 propagates within at least a portion of the ear canal 114 of the user 106, as described with respect to FIG. 5.

At 1204, an ultrasound receive signal is received. The ultrasound receive signal represents a version of the ultrasound transmit signal with one or more waveform characteristics modified based on the propagation within the ear canal and based on the person speaking during at least a portion of the first time period. For example, the transducer 406 (or the microphone 410) of the hearable 102 receives the ultrasound receive signal 504. The ultrasound receive signal 504 represents a version of the ultrasound transmit signal 502 with one or more waveform characteristics modified based on the propagation within the ear canal 114 and based on the user 106 speaking (e.g., generating the speech 208) during at least a portion of the first time period. The user 106 can generate the speech 208 by audibly speaking, humming, singing, whispering, shouting, and so forth. The speech 208 may include words and/or other sounds.

The hearable 102 that receives the ultrasound receive signal 504 can be a same hearable 102 that transmitted the ultrasound transmit signal 502 (e.g., the hearable 102-1 or 102-2 in FIG. 5), or another hearable 102 that did not transmit the ultrasound transmit signal 502 (e.g., the hearable 102-2 in FIG. 5). Example waveform characteristics include amplitude, phase, and/or frequency. In some implementations, a feedback microphone of an active-noise-cancellation circuit 424 can receive the ultrasound receive signal 504.

At 1206, the person is authenticated based on the ultrasound receive signal. For example, the hearable 102 uses the ultrasound-based authenticator 420 to analyze the one or more modified characteristics of the ultrasound receive signal 504 and authenticate the user 106. In an example implementation, the ultrasound-based authenticator 420 can generate a user embedding 1008 that is based on an ultrasound-based voice signature 618 of the user 106 and compare this user embedding 1008 to a previously-generated user embedding 1008 to authenticate the user 106. The user embedding 1008 can represent the content of the user 106's speech 208 and/or can represent the manner in which the user 106 speaks.

The authentication step at 1206 can involve authenticating the user 106 based, at least in part, on the physiological component 702 and the voice component 704 that can be derived from the pre-processed signal 1110. In some implementations, the authenticating of the user 106 is also based on the audio voice signal 616 and/or the sensor data 620. The ultrasound-based authenticator 420 can generate an authentication indicator 612 to communicate to the computing device 104 whether or not the authentication 112 is successful. The computing device 104 can perform appropriate actions based on the authentication indicator 612.

At 1302 in FIG. 13, active acoustic sensing is performed to detect deformation that occurs within an ear canal of a person during a time period that the person speaks. For example, the hearable 102 performs active acoustic sensing (or audioplethysmography 110) to detect deformation of an ear canal 114 of a user 106, which occurs while the user 106 speaks. To perform active acoustic sensing, the hearable 102 transmits and receives an ultrasound signal (e.g., the ultrasound transmit signal 502 and the ultrasound receive signal 504). The ultrasound receive signal 504 includes a voice component 704 and a physiological component 702, which can be used to perform authentication 112.

At 1304, the person is determined to be an authenticated user of a device based on the active acoustic sensing. For example, the hearable 102 performs authentication 112 based on the active acoustic sensing. More specifically, the hearable 102 analyzes the ultrasound receive signal 504 to generate the ultrasound-based voice signature 618. In some implementations, the hearable 102 can perform authentication 112 using a combination of the ultrasound receive signal 504 and the audio voice signal 616.

At 1306, a signal that controls an operation of the device is generated based on the determination. For example, the ultrasound-based authenticator 420 generates the authentication indicator 612, which controls an operation of the device based on the determination. The device can represent the hearable 102 and/or the computing device 104. An example operation can include activating a virtual assistant 202.

Example Computing System

Figure 14:
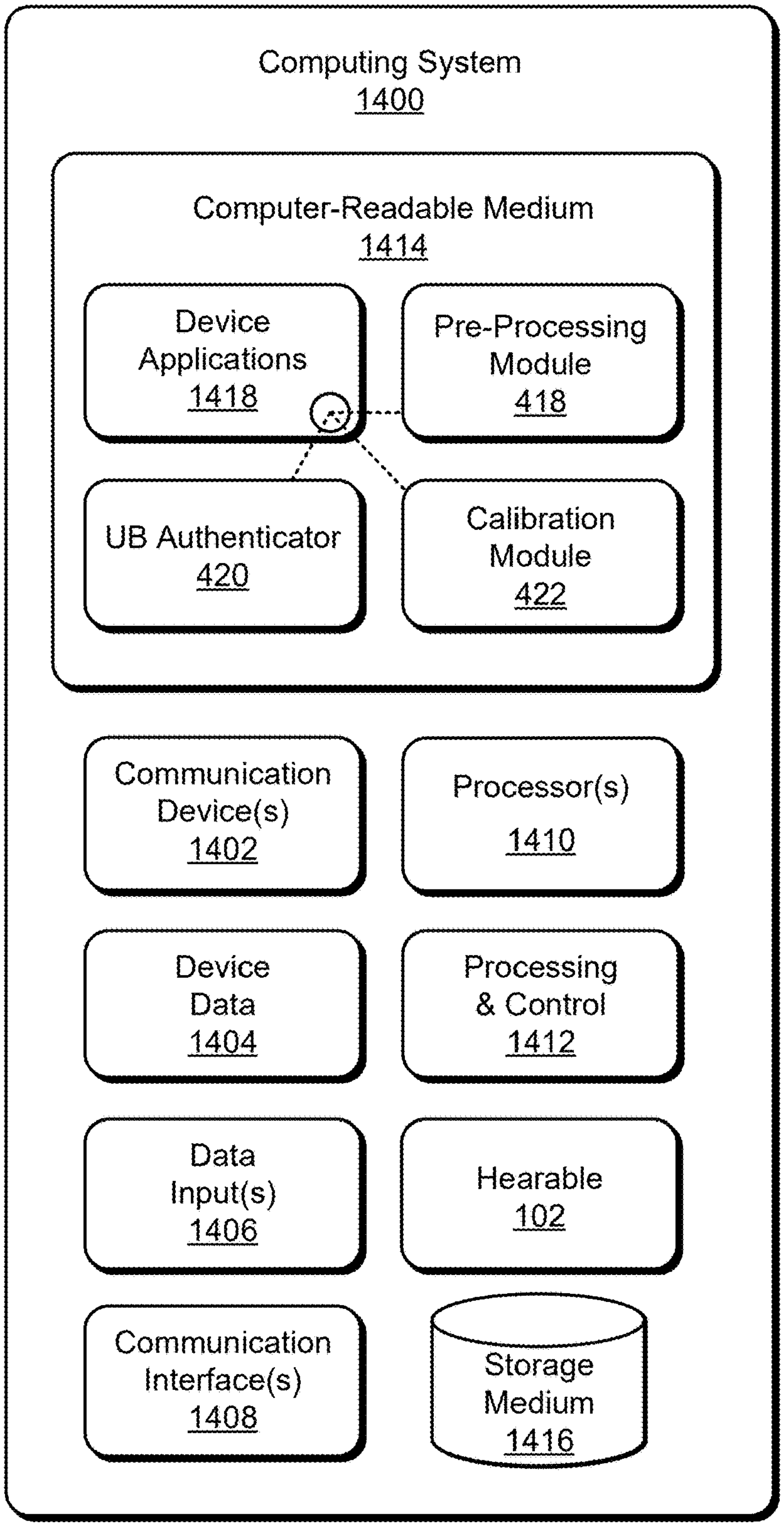
FIG. 14 illustrates an example computing system embodying, or in which techniques may be implemented that enable use of, authentication using active acoustic sensing.

FIG. 14 illustrates various components of an example computing system 1400 that can be implemented as any type of client, server, and/or computing device as described with reference to the previous FIGS. 3 and 4 to implement aspects of active acoustic sensing using a hearable 102.

The computing system 1400 includes communication devices 1402 that enable wired and/or wireless communication of device data 1404 (e.g., received data, data that is being received, data scheduled for broadcast, or data packets of the data). The communication devices 1402 or the computing system 1400 can include one or more hearables 102. The device data 1404 or other device content can include configuration settings of the device, media content stored on the device, and/or information associated with a user of the device. Media content stored on the computing system 1400 can include any type of audio, video, and/or image data. The computing system 1400 includes one or more data inputs 1406 via which any type of data, media content, and/or inputs can be received, such as human utterances, user-selectable inputs (explicit or implicit), messages, music, television media content, recorded video content, and any other type of audio, video, and/or image data received from any content and/or data source.

The computing system 1400 also includes communication interfaces 1408, which can be implemented as any one or more of a serial and/or parallel interface, a wireless interface, any type of network interface, a modem, and as any other type of communication interface. The communication interfaces 1408 provide a connection and/or communication links between the computing system 1400 and a communication network by which other electronic, computing, and communication devices communicate data with the computing system 1400.

The computing system 1400 includes one or more processors 1410 (e.g., any of microprocessors, controllers, and the like), which process various computer-executable instructions to control the operation of the computing system 1400. Alternatively or in addition, the computing system 1400 can be implemented with any one or combination of hardware, firmware, or fixed logic circuitry that is implemented in connection with processing and control circuits which are generally identified at 1412. Although not shown, the computing system 1400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1400 also includes a computer-readable medium 1414, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 1400 can also include a mass storage medium device (storage medium) 1416.

The computer-readable medium 1414 provides data storage mechanisms to store the device data 1404, as well as various device applications 1418 and any other types of information and/or data related to operational aspects of the computing system 1400. For example, an operating system 1420 can be maintained as a computer application with the computer-readable medium 1414 and executed on the processors 1410. The device applications 1418 may include a device manager, such as any form of a control application, software application, signal-processing and control module, code that is native to a particular device, a hardware abstraction layer for a particular device, and so on.

The device applications 1418 also include any system components, engines, or managers to implement audioplethysmography 110 for authentication 112. In this example, the device applications 1418 include the pre-processing module 418, the ultrasound-based authenticator 420 (UB authenticator 420), and optionally the calibration module 422. Although not explicitly shown, the device applications 1418 can also include the virtual assistant 202 and/or the application 306.

Throughout this disclosure, examples are described where a computing system 1400 (e.g., the hearable 102, the computing device 104, a client device, a server device, a computer, or another type of computing system) may analyze information (e.g., various audible and/or ultrasound signals) associated with a user 106, for example, the speech 208 mentioned with respect to FIGS. 2-1 and 2-2. Further to the descriptions above, a user 106 may be provided with controls allowing the user 106 to make an election as to both if and when systems, programs, and/or features described herein may enable collection of information (e.g., information about a user 106's social network, social actions, social activities, profession, a user 106's preferences, a user 106's current location), and if the user 106 is sent content or communications from a server. The computing system 1400 can be configured to only use the information after the computing system 1400 receives explicit permission from the user 106 to use the data. For example, in situations where the hearable 102 analyzes signals to generate the ultrasound-based voice signature 618, the audio voice signal 616, and/or the sensor data 620, individual users 106 may be provided with an opportunity to provide input to control whether programs or features of the computing system 1400 can collect and make use of the data. Further, individual users 106 may have constant control over what programs can or cannot do with the information.

In addition, information collected may be pre-treated in one or more ways before it is transferred, stored, or otherwise used, so that personally-identifiable information is removed. For example, before the computing system 1400 shares data with another device, a user 106's identity may be treated so that no personally identifiable information can be determined for the user 106. Thus, the user 106 may have control over whether information is collected about the user 106 and the user 106's device, and how such information, if collected, may be used by the computing system 1400 and/or a remote computing system.

CONCLUSION

Although techniques using, and apparatuses including, performing authentication using active acoustic sensing have been described in language specific to features and/or methods, it is to be understood that the subject of the appended examples is not necessarily limited to the specific features or methods described. Rather, the specific features and methods are disclosed as example implementations of performing authentication using active acoustic sensing.

Some examples are described below.

Example 1: A method comprising:

transmitting, during a first time period, an ultrasound transmit signal that propagates within at least a portion of an ear canal of a person;

receiving, during the first time period, an ultrasound receive signal, the ultrasound receive signal representing a version of the ultrasound transmit signal with one or more characteristics modified based on the propagation within the ear canal and based on the person speaking during at least a portion of the first time period;

generating an ultrasound-based voice signature based on the ultrasound receive signal, the ultrasound-based voice signature comprising a voice component and a physiological component; and authenticating the person based on the ultrasound-based voice signature.

Example 2: The method of example 1, wherein:

the voice component of the ultrasound-based voice signature is associated with a first portion of the ultrasound receive signal that includes frequencies greater than approximately 50 hertz; and the physiological component of the ultrasound-based voice signature is associated with a second portion of the ultrasound receive signal that includes frequencies less than approximately 50 hertz.

Example 3: The method of any previous example, further comprising:

providing access to a virtual assistant on a device based on the authenticating.

Example 4: The method of example 3, wherein:

the device comprises a hearable;

the transmitting of the ultrasound transmit signal comprises transmitting the ultrasound transmit signal using the hearable; and the receiving of the ultrasound receive signal comprises receiving the ultrasound receive signal using the hearable.

Example 5: The method of example 3, wherein:

the device comprises a computing device that is coupled to a hearable;

the transmitting of the ultrasound transmit signal comprises transmitting the ultrasound transmit signal using the hearable; and the receiving of the ultrasound receive signal comprises receiving the ultrasound receive signal using the hearable.

Example 6: The method of example 5, wherein:

the device is positioned at a distance from the person;

the distance is within communication range of the hearable; and the distance is beyond a reach of the person.

Example 7: The method of any previous example, wherein the authenticating of the person comprises:

generating a user embedding based on the ultrasound-based voice signature;

comparing the user embedding to a previously-generated user embedding; and authenticating the person based on the comparison.

Example 8: The method of example 7, further comprising:

receiving an audio voice signal that includes the person speaking, wherein the generating of the user embedding comprises generating the user embedding based on the ultrasound-based voice signature and the audio voice signal.

Example 9: The method of example 8, further comprising:

generating sensor data using an auxiliary sensor, wherein the generating of the user embedding comprises generating the user embedding based on the ultrasound-based voice signature, the audio voice signal, and the sensor data.

Example 10: The method of any one of examples 7 to 9, wherein the generating the user embedding comprises generating the user embedding to represent at least one of the following:

a manner in which the person is speaking; or content of the person's speech.

Example 11: The method of any previous example, further comprising:

transmitting, during a second time period, a second ultrasound transmit signal that propagates within at least a portion of an ear canal of another person;

receiving, during the second time period, a second ultrasound receive signal, the second ultrasound receive signal representing a version of the second ultrasound transmit signal with one or more characteristics modified based on the propagation within the ear canal and based on the other person speaking during at least a portion of the second time period;

generating a second ultrasound-based voice signature based on the second ultrasound signal; and determining that the other person is not the person based on the second ultrasound-based voice signature.

Example 12: The method of example 11, further comprising:

disabling access to a virtual assistant on a device based on the determination.

Example 13: The method of any previous example, further comprising:

rendering audible content during the first time period, the rendering causing an audible signal to propagate within at least a portion of the ear canal of the person.

Example 14: A non-transitory computer-readable storage medium comprising instructions that, responsive to execution by a processor, cause a hearable to perform any one of the methods of examples 1 to 13.

Example 15: A device comprising:

at least one transducer; and at least one processor, the device configured to perform, using the at least one transducer and the at least one processor, any one of the methods of examples 1 to 13.

Example 16: The device of example 15, further comprising:

a speaker; and an active-noise-cancellation circuit comprising a feedback microphone, wherein the at least one transducer comprises the speaker and the feedback microphone.

Example 17: The device of example 15, wherein:

the at least one transducer comprises a speaker and a microphone;

the speaker is configured to be positioned proximate to a first ear of a person; and the microphone is configured to be positioned proximate to a second ear of the person.

Example 18: The device of any one of examples 15 to 17, wherein the device comprises: at least one earbud.

What is claimed is:

1. A method comprising:

transmitting, during a first time period, an ultrasound transmit signal that propagates within at least a portion of an ear canal of a person;

receiving, during the first time period, an ultrasound receive signal, the ultrasound receive signal representing a version of the ultrasound transmit signal with one or more characteristics modified based on the propagation within the ear canal and based on the person speaking during at least a portion of the first time period;

generating an ultrasound-based voice signature based on the ultrasound receive signal, the ultrasound-based voice signature comprising a voice component and a physiological component; and authenticating the person based on the ultrasound-based voice signature.

2. The method of claim 1, wherein:

the voice component of the ultrasound-based voice signature is associated with a first portion of the ultrasound receive signal that includes frequencies greater than approximately 50 hertz; and the physiological component of the ultrasound-based voice signature is associated with a second portion of the ultrasound receive signal that includes frequencies less than approximately 50 hertz.

3. The method of claim 1, further comprising:

providing access to a virtual assistant on a device based on the authenticating.

4. The method of claim 3, wherein:

the device comprises a hearable;

the transmitting of the ultrasound transmit signal comprises transmitting the ultrasound transmit signal using the hearable; and the receiving of the ultrasound receive signal comprises receiving the ultrasound receive signal using the hearable.

5. The method of claim 3, wherein:

the device comprises a computing device that is coupled to a hearable;

the transmitting of the ultrasound transmit signal comprises transmitting the ultrasound transmit signal using the hearable; and the receiving of the ultrasound receive signal comprises receiving the ultrasound receive signal using the hearable.

6. The method of claim 5, wherein:

the device is positioned at a distance from the person;

the distance is within communication range of the hearable; and the distance is beyond a reach of the person.

7. The method of claim 1, wherein the authenticating of the person comprises:

generating a user embedding based on the ultrasound-based voice signature;

comparing the user embedding to a previously-generated user embedding; and authenticating the person based on the comparison.

8. The method of claim 7, further comprising:

receiving an audio voice signal that includes the person speaking, wherein the generating of the user embedding comprises generating the user embedding based on the ultrasound-based voice signature and the audio voice signal.

9. The method of claim 8, further comprising:

generating sensor data using an auxiliary sensor, wherein the generating of the user embedding comprises generating the user embedding based on the ultrasound-based voice signature, the audio voice signal, and the sensor data.

10. The method of claim 7, wherein the generating the user embedding comprises generating the user embedding to represent at least one of the following:

a manner in which the person is speaking; or content of the person's speech.

11. The method of claim 1, further comprising:

transmitting, during a second time period, a second ultrasound transmit signal that propagates within at least a portion of an ear canal of another person;

receiving, during the second time period, a second ultrasound receive signal, the second ultrasound receive signal representing a version of the second ultrasound transmit signal with one or more characteristics modified based on the propagation within the ear canal and based on the other person speaking during at least a portion of the second time period;

generating a second ultrasound-based voice signature based on the second ultrasound signal; and determining that the other person is not the person based on the second ultrasound-based voice signature.

12. The method of claim 11, further comprising:

disabling access to a virtual assistant on a device based on the determination.

13. The method of claim 1, further comprising:

rendering audible content during the first time period, the rendering causing an audible signal to propagate within at least a portion of the ear canal of the person.

14. A non-transitory computer-readable storage medium comprising instructions that, responsive to execution by a processor, cause a system to:

transmit, during a first time period, an ultrasound transmit signal that propagates within at least a portion of an ear canal of a person;

receive, during the first time period, an ultrasound receive signal, the ultrasound receive signal representing a version of the ultrasound transmit signal with one or more characteristics modified based on the propagation within the ear canal and based on the person speaking during at least a portion of the first time period;

generate an ultrasound-based voice signature based on the ultrasound receive signal, the ultrasound-based voice signature comprising a voice component and a physiological component; and authenticate the person based on the ultrasound-based voice signature.

15. The non-transitory computer-readable storage medium of claim 14, wherein the instructions cause the system to:

generate a user embedding based on the ultrasound-based voice signature;

compare the user embedding to a previously-generated user embedding; and authenticate the person based on the comparison.

16. The non-transitory computer-readable storage medium of claim 15, wherein the instructions cause the system to:

receive an audio voice signal that includes the person speaking; and generate the user embedding based on the ultrasound-based voice signature and the audio voice signal.

17. A device comprising:

at least one transducer configured to:

transmit, during a first time period, an ultrasound transmit signal that propagates within at least a portion of an ear canal of a person; and receive, during the first time period, an ultrasound receive signal, the ultrasound receive signal representing a version of the ultrasound transmit signal with one or more characteristics modified based on the propagation within the ear canal and based on the person speaking during at least a portion of the first time period; and at least one processor that is coupled to the at least one transducer, the at least one processor configured to:

generate an ultrasound-based voice signature based on the ultrasound receive signal, the ultrasound-based voice signature comprising a voice component and a physiological component; and authenticate the person based on the ultrasound-based voice signature.

18. The device of claim 17, further comprising:

a speaker; and an active-noise-cancellation circuit comprising a feedback microphone, wherein the at least one transducer comprises the speaker and the feedback microphone.

19. The device of claim 17, wherein:

the at least one transducer comprises a speaker and a microphone;

the speaker is configured to be positioned proximate to a first ear of a person; and the microphone is configured to be positioned proximate to a second ear of the person.

20. The device of claim 17, wherein the device comprises:

at least one earbud.

* * * * *